US012634360B2

(12) United States Patent
Hurst et al.

(10) Patent No.: US 12,634,360 B2
(45) Date of Patent: May 19, 2026

(54) METHODS, APPARATUSES, AND SYSTEMS FOR NETWORK ANALYSIS

(71) Applicant: Assurant, Inc., New York, NY (US)

(72) Inventors: Cameron Hurst, Asheville, NC (US); Joan Patricia McDonald Meyer, Smyrna, GA (US); Stuart Saunders, Lakewood, OH (US)

(73) Assignee: Assurant, Inc., New York, NY (US)

( * ) Notice: Subject to any disclaimer, the term of this patent is extended or adjusted under 35 U.S.C. 154(b) by 549 days.

(21) Appl. No.: 18/146,141

(22) Filed: Dec. 23, 2022

(65) Prior Publication Data

US 2023/0208904 A1     Jun. 29, 2023

Related U.S. Application Data

(63) Continuation of application No. 16/880,105, filed on May 21, 2020, now Pat. No. 11,563,796, which is a
(Continued)

(51) Int. Cl.
H04L 67/025 (2022.01)
H04L 67/04 (2022.01)
(Continued)

(52) U.S. Cl.
CPC ............ H04L 67/025 (2013.01); H04L 67/04 (2013.01); H04L 67/10 (2013.01); H04L 67/52 (2022.05);
(Continued)

(58) Field of Classification Search
CPC ....... H04L 67/025; H04L 67/04; H04L 67/10; H04L 67/52; H04L 43/08; H04L 41/14;
(Continued)

(56) References Cited

U.S. PATENT DOCUMENTS 7,324,815 B2 *   1/2008   Ross ..................... H04W 24/00
                                                              455/425
7,636,576 B1    12/2009   Pfister et al.
                          (Continued)

FOREIGN PATENT DOCUMENTS

CN        101755473 A      6/2010
CN        103354986 A     10/2013
                (Continued)

OTHER PUBLICATIONS

Alhamoud, A et al., smartenerg?y.kom: An Intelligent System for Energy Saving in Smart Home, 39th Annual IEEE Conference on Local Computer Networks Workshops, IEEE (Sep. 2014) 685-692.
(Continued)

*Primary Examiner* — Ayanah S George
(74) *Attorney, Agent, or Firm* — Alston & Bird LLP

(57)                ABSTRACT

Methods, systems, apparatuses, and computer readable media for providing a network analysis system are disclosed. An example of a system for providing a network analysis system includes at least one satellite device configured to monitor wireless network traffic to determine at least one network communication event, generate an event message based on the at least one network communication event, and transmit the event message. The system also includes a controller device configured to receive the event message, determine an identity of at least one device communicating during the network communication event, determine a network status based at least in part on the identity of the at least one device, and provide the network status via an interface.

19 Claims, 16 Drawing Sheets

100

Related U.S. Application Data continuation of application No. 16/238,228, filed on Jan. 2, 2019, now Pat. No. 10,701,578, which is a continuation of application No. 14/878,570, filed on Oct. 8, 2015, now Pat. No. 10,212,618.

(60) Provisional application No. 62/061,205, filed on Oct. 8, 2014.

(51) Int. Cl.
| | |
|---|---|
| *H04L 67/10* | (2022.01) |
| *H04L 67/52* | (2022.01) |
| *H04W 12/08* | (2021.01) |
| *H04W 12/084* | (2021.01) |
| *H04W 24/08* | (2009.01) |
| *H04W 24/10* | (2009.01) |

(52) U.S. Cl.
CPC ......... *H04W 12/08* (2013.01); *H04W 12/084* (2021.01); *H04W 24/08* (2013.01); *H04W 24/10* (2013.01)

(58) Field of Classification Search
CPC ..... H04L 41/12; H04L 41/22; H04L 41/0803; H04L 43/02; H04W 12/08; H04W 12/084; H04W 24/08; H04W 24/10; H04W 84/12; H04W 8/005; H04W 24/02; H04W 84/06
See application file for complete search history.

(56) References Cited

U.S. PATENT DOCUMENTS

| | | | |
|---|---|---|---|
| 2002/0138618 | A1 | 9/2002 | Szabo |
| 2006/0019679 | A1 | 1/2006 | Rappaport et al. |
| 2008/0002677 | A1 | 1/2008 | Bugenhagen et al. |
| 2008/0100465 | A1 | 5/2008 | Montague |
| 2010/0022263 | A1 | 1/2010 | Stamoulis et al. |
| 2010/0317371 | A1 | 12/2010 | Westerinen et al. |
| 2011/0044354 | A1 | 2/2011 | Wei |
| 2011/0169695 | A1 | 7/2011 | Abraham et al. |
| 2012/0184306 | A1 | 7/2012 | Zou et al. |
| 2012/0314063 | A1 | 12/2012 | Cirker |
| 2013/0052959 | A1 | 2/2013 | Rubin et al. |
| 2013/0109375 | A1 | 5/2013 | Zeiler et al. |
| 2013/0281122 | A1 | 10/2013 | Zelinka |
| 2013/0322276 | A1 | 12/2013 | Pelletier et al. |
| 2014/0306832 | A1 | 10/2014 | Goose |
| 2015/0245276 | A1* | 8/2015 | Lee ..................... H04W 40/246 370/254 |
| 2017/0034560 | A1* | 2/2017 | Garner ............. H04N 21/43637 |
| 2017/0223700 | A1* | 8/2017 | Thubert .................. H04L 45/02 |

FOREIGN PATENT DOCUMENTS

| | | | |
|---|---|---|---|
| EP | 2512172 | A2 | 10/2012 |
| EP | 3246723 | A1 | 11/2017 |
| KR | 10-2003-0089604 | A | 11/2003 |
| KR | 10-2011-0032304 | | 3/2011 |
| KR | 10-2012-0017195 | | 2/2012 |
| KR | 10-2012-0062929 | | 6/2012 |
| KR | 10-2013-0046522 | | 5/2013 |
| KR | 10-2013-0125389 | A | 11/2013 |
| WO | 2011/041434 | A1 | 4/2011 |

OTHER PUBLICATIONS

Bhagwat, P. et al., Smart Non-invasive Wireless Physiological Monitoring System, 2014 International Conference on Embedded Systems (ICES), IEEE, (Jul. 2014) 157-161.

CN Office Action for China Applln No. 201580064008.7 issued Aug. 29, 2019 with English translation (10 pages).

EPO, Extended European Search Report for corresponding EP Application No. 20193336.3-1212 / 3817334 (11 pages), Jun. 17, 2021.

EPO, Partial European Search Report for EP Application No. 20193336.3 (13 pages), Mar. 16, 2021.

Internation Search Report and Written Opinion for Corresponding International Application No. PCT/IB2015/057713, dated Apr. 1, 2016.

Invitation to Pay Additional Fees and Partial International Search Report for corresponding International Application No. PCT/IB2015/057713, dated Jan. 21, 2016, 6 pages.

KIPO, Corresponding Korean Applln No. 10-2020-7005733 1st Office Action mailed Mar. 10, 2020, 4 pages.

KR 10-2013-0046522 System and Method for Position Determination, 2013.

KR Office Action from Application No. 10-2019-7008747, issued Apr. 18, 2019, with English translation 7 pages.

Extended European Search Report Mailed on Jun. 5, 2024 for EP Application No. 23200386, 19 page(s).

BR Office Action Mailed on Oct. 3, 2023 for BR Application No. 112017007052, 5 page(s).

English Translation of BR Office Action dated Oct. 3, 2023 for BR Application No. 112017007052, 8 page(s).

English Translation of KR Office Action dated Nov. 20, 2023 for KR Application No. 10-2023-7003715, 5 page(s).

Immature declaration of out-of-coverage UE, 3GPP TSGF-RAN WG2 #85bis, R2-141719, Mar. 31-Apr. 4, 2014 (1 page).

KR Office Action Mailed on Nov. 20, 2023 for KR Application No. 10-2023-7003715, 6 page(s).

English Translation of MX Office Action dated Jan. 13, 2026 for MX Application No. MX/A/2023/009727, 8 page(s).

MX Office Action Mailed on Jan. 13, 2026 for MX Application No. MX/A/2023/009727, 9 page(s).

\* cited by examiner

100

200

900

1000

1002

Monitor Wireless Frequency Bands

1004

Detect Network Communication Event

1006

Generate Event Sequence Number

1008

Generate Event Message

1010

Transmit Event Message to Controller

1100

1200

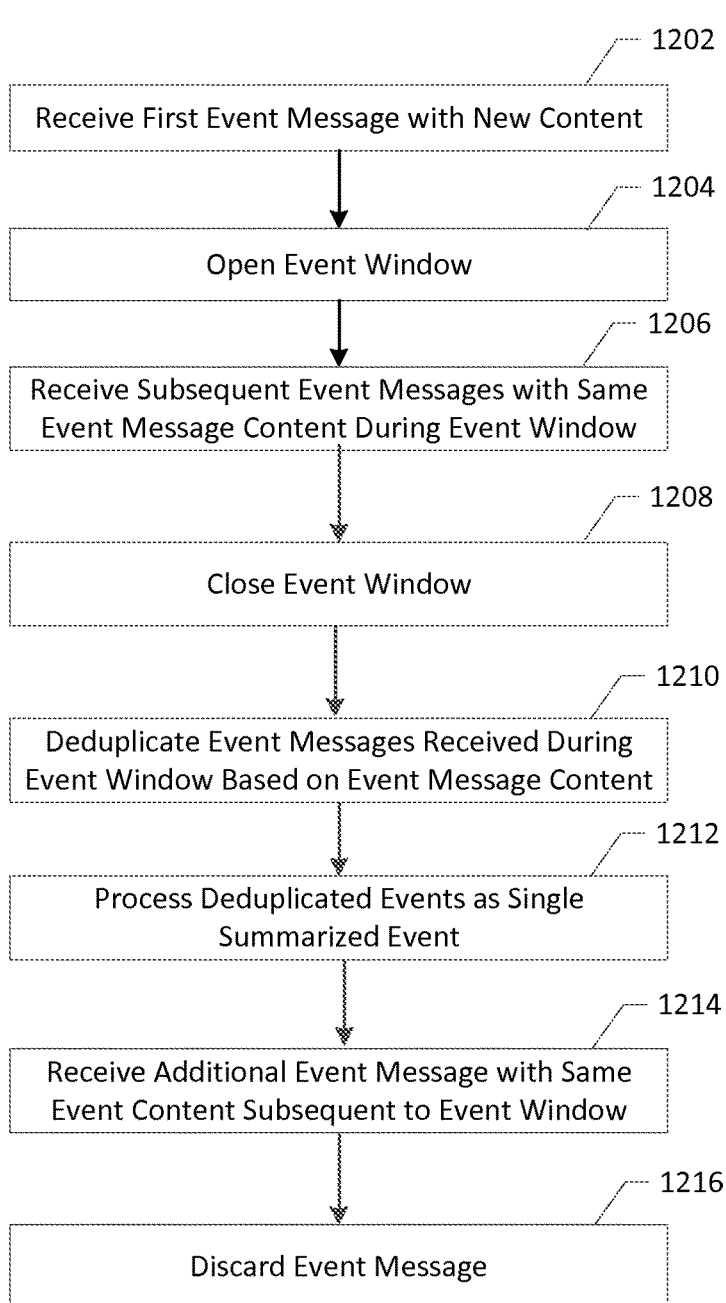

Receive First Event Message with New Content — 1202

Open Event Window — 1204

Receive Subsequent Event Messages with Same Event Message Content During Event Window — 1206

Close Event Window — 1208

Deduplicate Event Messages Received During Event Window Based on Event Message Content — 1210

Process Deduplicated Events as Single Summarized Event — 1212

Receive Additional Event Message with Same Event Content Subsequent to Event Window — 1214

Discard Event Message — 1216

Receive Premises Data

1304

Determine Device Location Based on Events
Received from a Plurality of Satellites

1306

Generate Premises Map Using Device Locations
and Premises Data

1308

Provide Premises Map Via Management Interface

1400

1402

Receive Aggregated Event Message

1404

Determine Event Protocol of Aggregated Event Message

1406

Decode and Process Communication Event(s) Based on Event Protocol

1408

Store Message Metadata Derived from Processed Communication Event

1500

1502

Receive Rule Configuration Data

1504

Receive Message Metadata

1506

Determine Rule Criteria Status Based on Rule Configuration Data and Message Metadata

1508

Generate Notification Based on Rule Criteria Status

1510

Transmit Notification

1600

1700

1702

Detect Presence of New Device Based on
Communication Event

1704

Determine Location of New Device

1706

Generate Notification to External Camera to
Direct to Location of New Device

METHODS, APPARATUSES, AND SYSTEMS FOR NETWORK ANALYSIS

CROSS REFERENCE TO RELATED APPLICATIONS

This application is a continuation of U.S. application Ser. No. 16/880,105, titled "METHODS, APPARATUSES, AND SYSTEMS FOR NETWORK ANALYSIS," filed May 21, 2020, which is a continuation of U.S. application Ser. No. 16/238,228 (published as U.S. 2019/0246296), titled "Methods, Apparatuses, and Systems for Network Analysis", and filed Jan. 2, 2019; which is a continuation of U.S. application Ser. No. 14/878,570 (published as U.S. Pat. No. 10,212, 618), titled "Methods, Apparatuses, and Systems for Network Analysis", and filed Oct. 8, 2015; which application claims the benefit of U.S. Provisional Application No. 62/061,205, titled "Methods, Apparatuses, and Systems For Providing A Digital Concierge Device", and filed Oct. 8, 2014. The entire contents of each of the above-referenced patents, publications, and patent applications are expressly incorporated by reference herein in their entireties.

TECHNOLOGICAL FIELD

Example embodiments of the present invention relate generally to detection and management of network devices and, more particularly, to a network analysis device for detection, management, troubleshooting, and optimization of a network.

BACKGROUND

The applicant has discovered problems with current methods, systems, and apparatuses for managing network devices. Through applied effort, ingenuity, and innovation, Applicant has solved many of these identified problems by developing a solution that is embodied by the present invention, which is described in detail below.

BRIEF SUMMARY

Methods, apparatuses, and computer program products provide a network analysis device for monitoring, management, and troubleshooting of a network. The network analysis device is capable of detecting the presence of devices on a wireless network by monitoring wireless network traffic. Detected devices may be presented via a graphical user interface to provide an interface for displaying the presence of detected devices, optimizing the performance of detected devices, troubleshooting errors associated with detected devices, and the like. Embodiments may also assist with management of device warranty and insurance plans and registering devices for said warranty and insurance plans. Yet further embodiments may take certain actions upon detection of particular devices, such as generating a notification when an unauthorized device is detected. In some embodiments, a rules engine may take particular actions upon detection of devices. For example, a user may utilize device detection features of the digital concierge to detect the comings and goings of particular users and log the times of such comings and goings. Some example embodiments may employ additional or alternative device detection features, such as bar code scanners, receipt readers, stock keeping unit (SKU) readers, or the like.

Embodiments include a system for providing computer network analysis. The system includes at least one satellite device configured to monitor wireless network traffic to determine at least one network communication event between a first network device and a second network device other than the satellite device, generate an event message based on the at least one network communication event, and transmit the event message. The system also includes a controller device configured to receive the event message, determine an identity of at least one device communicating during the network communication event, determine a network status based at least in part on the identity of the at least one device, and provide the network status via a management interface.

The event message may include a signal strength of the network communication event and the controller device may be further configured to determine a location of the at least one device based at least in part on the signal strength. The event message may include a protocol identifier. The controller device may be further configured to identify a device type for the at least one device based at least in part on the event message. The at least one satellite device may be further configured to monitor the wireless network traffic by detecting network transmissions between a first network device and a second network device, the first network device and the second network device may both be different devices from the at least one satellite device and the controller device. The event message may include a packet header of the network communication event. A clock of the at least one satellite device and a clock of the controller device may be synchronized with one another. The event message may include a timestamp derived based on a reading from the clock of the at least one satellite device. The network communication event may be a network message transmitted according to an 802.11 protocol, a ZigBee protocol, or a Bluetooth protocol.

Embodiments also include a method for providing a network analysis system. The method includes receiving, at a controller device, a first event message from a first satellite device, the first event message comprising content based on a first network communication event between a first network device and a second network device, receiving, at the controller device, a second event message from a second satellite device, the second event message comprising content based on a second network communication event between a third network device and a fourth network device, and processing, by the controller device, the first event message and the second event message to determine a network status, wherein the network status comprises an indicator of the presence of each of the first, second, third, and fourth network devices. The first event message may include a signal strength of the first network communication event and wherein the controller device is further configured to determine a location of the first network device based at least in part on the signal strength. The first event message may include a protocol identifier. The controller device may be further configured to identify a device type for each of the first network device and the second network device based at least in part on the first event message. The at least one satellite device may be further configured to monitor the wireless network traffic by detecting network transmissions between a first network device and a second network device, the first network device and the second network device may both be different devices from the at least one satellite device and the controller device. The event message may include a packet header of the network communication event. The method may include synchronizing a clock of at least the first satellite device and a clock of the controller device. The event message may include a timestamp derived based on a reading from the clock of the at least one satellite device.

Embodiments also include an apparatus for providing computer network analysis comprising a processor coupled to a memory. The apparatus is configured to receive an event message, the event message based on at least one network communication event monitored by a satellite device, determine an identity of at least one device communicating during the network communication event, determine a network status based at least in part on the identity of the at least one device, and provide the network status via a management interface.

The event message may include a signal strength of the network communication event and the apparatus may be further configured to determine a location of the at least one device based at least in part on the signal strength. The event message may include a protocol identifier. The apparatus may be further configured to identify a device type for the at least one device based at least in part on the event message.

Embodiments also include a method for deduplicating event messages during a network analysis operation. The method includes receiving a first event message comprising a sequence identifier from a first satellite device, in response to receiving the first event message, opening an event window with a predefined length, receiving at least one second event message comprising the sequence identifier from a second satellite device prior to closing the event window, determining that the time period corresponding to the event window has elapsed, closing the event window, combining the first event message and the at least one second event message to generate an aggregated message, and processing the aggregated message to determine a network status.

The method may also include receiving a third event message comprising the sequence identifier, the third event message received subsequent to closing the event window, processing the aggregated message to determine a network status, and discarding the third event message. The method may include determining the predefined length by generating a calibration message, transmitting the calibration message to the first satellite device and the second satellite device, receiving a calibration response from the two or more satellite devices, the calibration response comprising a transmission timestamp, determining a latency for each of the first satellite device and the second satellite device based at least in part on the transmission timestamp, and selecting the predefined length based at least in part on a largest latency among the latency for the first satellite device and the second satellite device. The method may include generating at least one time synchronization message by the controller device, and transmitting the at least one time synchronization message to the first satellite device and the second satellite device. The method may include receiving an additional event message during a time in which the event window is opened, determining that the additional event message is associated with a sequence identifier other than the sequence identifier for the first event message, and opening up an additional event window for the additional event message, the additional event window associated with the sequence identifier other than the sequence identifier for the first event message. Each of the first event message and the second event message may be generated based on a same network communication event between at least two network devices other than the first satellite device and the second satellite device. The aggregated message may include a first signal strength from the first event message and a second signal strength from the second event message. The method may include determining a location of a transmitter of a network communication event based at least in part on the first signal strength and the second signal strength included in the aggregated message.

Embodiments also include an apparatus for providing network analysis comprising a processor coupled to a memory. The apparatus is configured to receive, by a controller device, a first event message comprising a sequence identifier from a first satellite device, in response to receiving the first event message, open an event window with a predefined length, receive at least one second event message comprising the sequence identifier from a second satellite device prior to closing the event window, determine that the time period corresponding to the event window has elapsed, close the event window, combine the first event message and the at least one second event message to generate an aggregated message, and process the aggregated message to determine a network status.

The apparatus may be further configured to receive a third event message comprising the sequence identifier, the third event message received subsequent to closing the event window, process the aggregated message to determine a network status, and discard the third event message. The apparatus may be further configured to generate a calibration message, transmit the calibration message to the first satellite device and the second satellite device, receive a calibration response from the two or more satellite devices, the calibration response comprising a transmission timestamp, determine a latency for each of the first satellite device and the second satellite device based at least in part on the transmission timestamp, and select the predefined length based at least in part on a largest latency among the latency for the first satellite device and the second satellite device. The apparatus may be further configured to generate at least one time synchronization message by the controller device, and transmit the at least one time synchronization message to the first satellite device and the second satellite device. The apparatus may be further configured to receive an additional event message during a time in which the event window is opened, determine that the additional event message is associated with a sequence identifier other than the sequence identifier for the first event message, and open up an additional event window for the additional event message, the additional event window associated with the sequence identifier other than the sequence identifier for the first event message. Each of the first event message and the second event message may be generated based on a same network communication event between at least two network devices other than the first satellite device and the second satellite device. The aggregated message may include a first signal strength from the first event message and a second signal strength from the second event message.

The apparatus may be further configured to determine a location of a transmitter of a network communication event based at least in part on the first signal strength and the second signal strength included in the aggregated message.

Embodiments also include a non-transitory computer readable storage medium comprising program instructions that, when executed by a processor, cause the processor to deduplicate event messages during a network analysis operation by at least receiving a first event message comprising a sequence identifier from a first satellite device, in response to receiving the first event message, opening an event window with a predefined length, receiving at least one second event message comprising the sequence identifier from a second satellite device prior to closing the event window, determining that the time period corresponding to the event window has elapsed, closing the event window, combining the first event message and the at least one second event message to generate an aggregated message, and processing the aggregated message to determine a network status.

The instructions may further cause the processor to receive a third event message comprising the sequence identifier, the third event message received subsequent to closing the event window, process the aggregated message to determine a network status, and discard the third event message. In some embodiments, the instructions may further cause the processor to generate a calibration message, transmit the calibration message to the first satellite device and the second satellite device, receive a calibration response from the two or more satellite devices, the calibration response comprising a transmission timestamp, determine a latency for each of the first satellite device and the second satellite device based at least in part on the transmission timestamp, and select the predefined length based at least in part on a largest latency among the latency for the first satellite device and the second satellite device. In some embodiments, the instructions may further cause the processor to generate at least one time synchronization message by the controller device, and transmit the at least one time synchronization message to the first satellite device and the second satellite device.

Another embodiment includes a method for providing network security in a network analysis system. The method includes detecting a loss of a primary power source in a satellite device of the network analysis system, in response to the loss of the primary power source, activating a redundant power supply of the satellite device, and in response to activating the redundant power supply, disabling a visual indicator of a powered status coupled to the satellite device.

Another embodiment includes a method for providing a network analysis system. The method includes receiving, at a controller, an event message from a satellite device, the event message comprising content based on a first network communication event between a first network device and a second network device, processing, by a network analysis component of the controller, the event message to determine a network status, wherein the network status comprises an indicator of the presence of each of the first network device and the second network device, determining, by a rules engine component of the controller, that the second network device is unauthorized, in response to determining that the second network device is unauthorized, generating a notification, by the rules engine component, and causing the notification to be displayed via a management interface.

Yet another embodiment includes an apparatus for providing a network analysis system. The apparatus includes a network analysis circuitry component configured to receive an event message from a satellite device, the event message comprising content based on a first network communication event between a first network device and a second network device, and process the event message to determine a network status, wherein the network status comprises an indicator of the presence of each of the first network device and the second network device. The apparatus also includes a device management circuitry component configured to determine, that the second network device is unauthorized, and in response to determining that the second network device is unauthorized, generate a notification, and a remote management circuitry component configured to cause the notification to be displayed via a management interface.

Yet another embodiment includes an apparatus for providing a network analysis system. The apparatus includes a network analysis circuitry component configured to receive an event message from a satellite device, the event message comprising content based on a first network communication event between a first network device and a second network device, process the event message to determine a network status, wherein the network status comprises an indicator of the presence of each of the first network device and the second network device, and determine a location of a transmitter of the first network communication event based at least in part on the event message. The apparatus also includes a device management circuitry component configured to determine that the second network device is unauthorized, and in response to determining that the second network device is unauthorized, generate a notification to a camera device, wherein the notification comprises an instruction to direct the camera device to the location of the transmitter of the first network communication event, and transmit the notification to the camera device.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Figure 1:
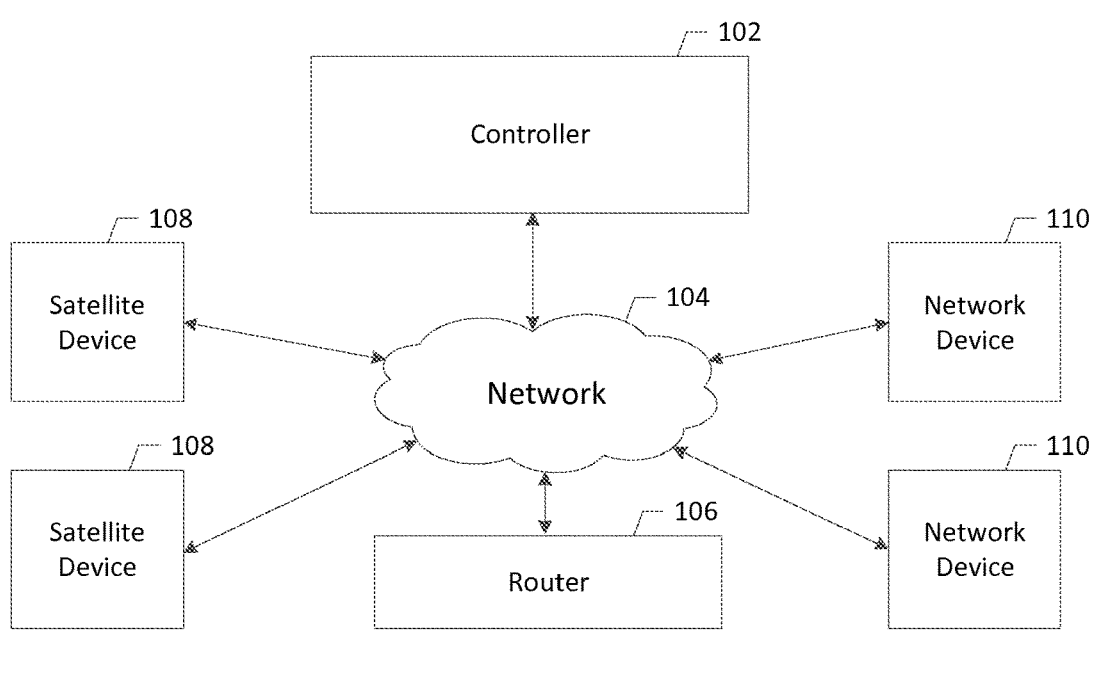
Figure 2:
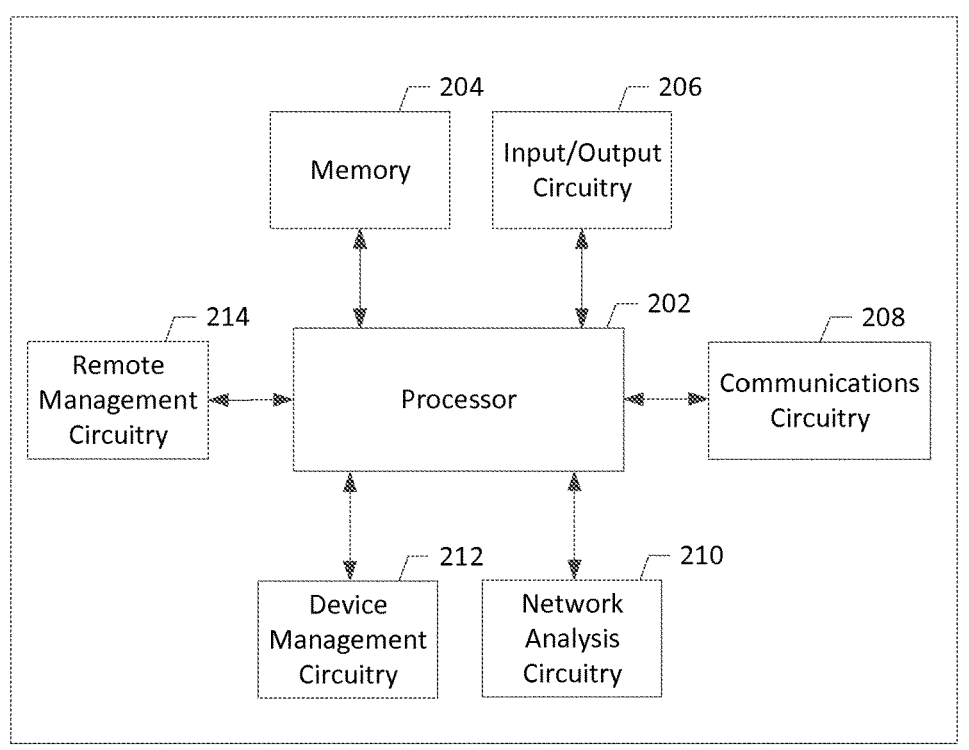
Figure 3:
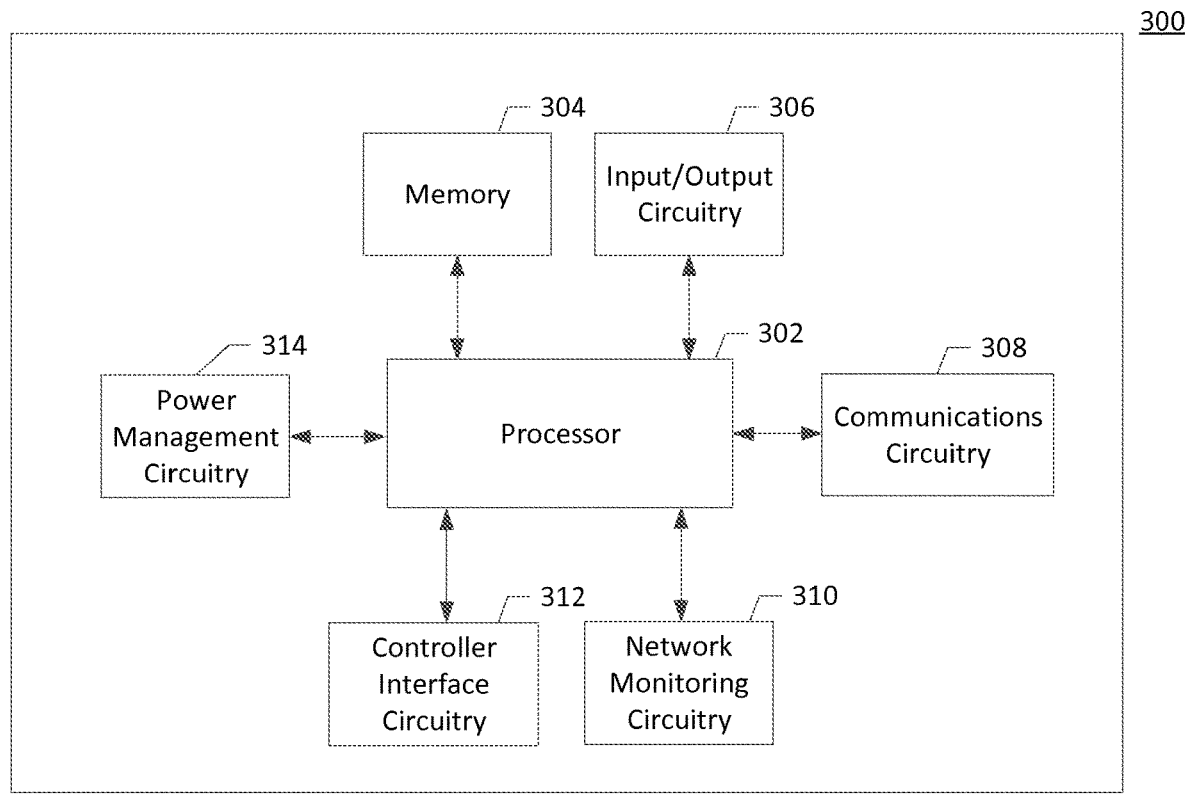
Figure 4:
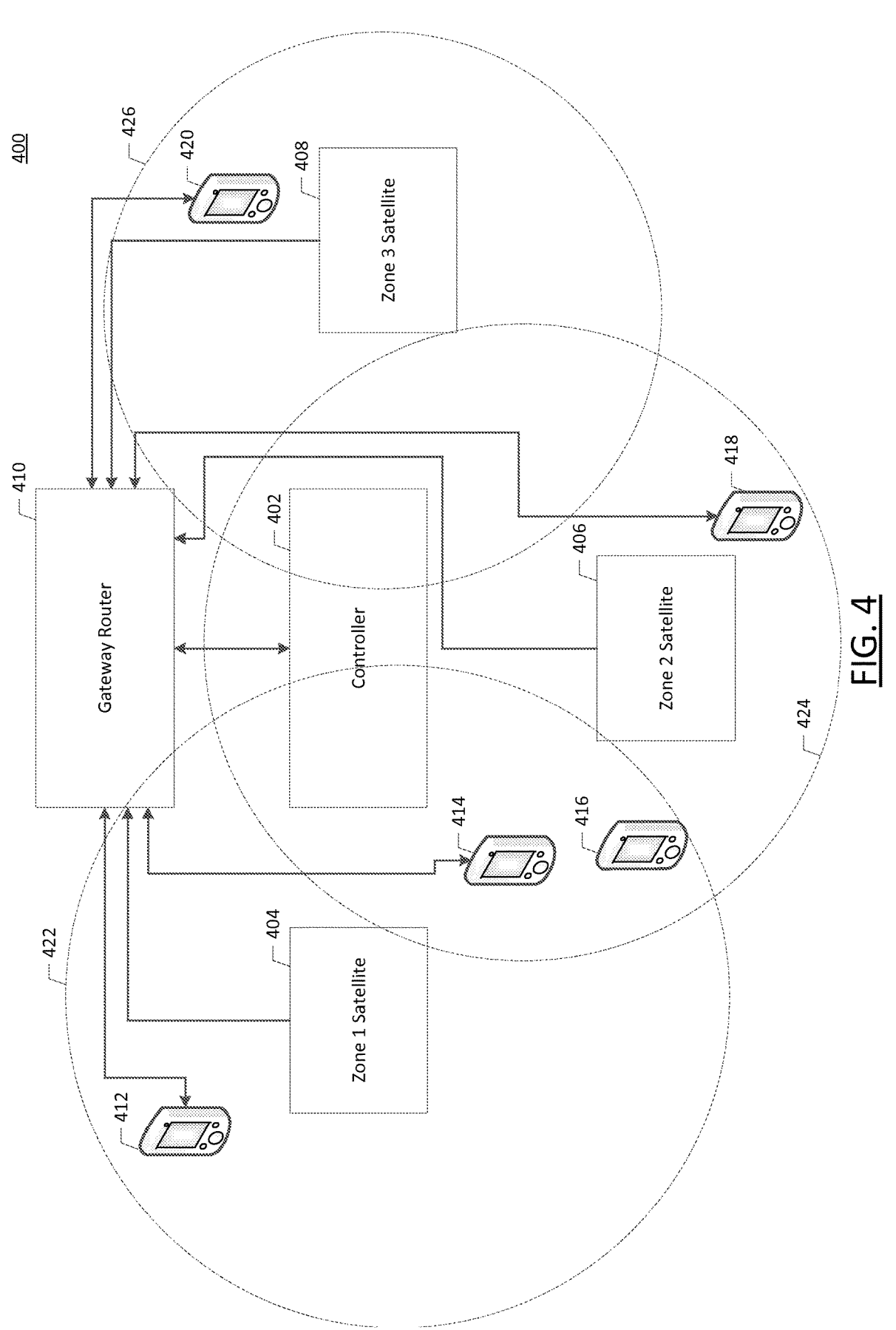
Figure 5:
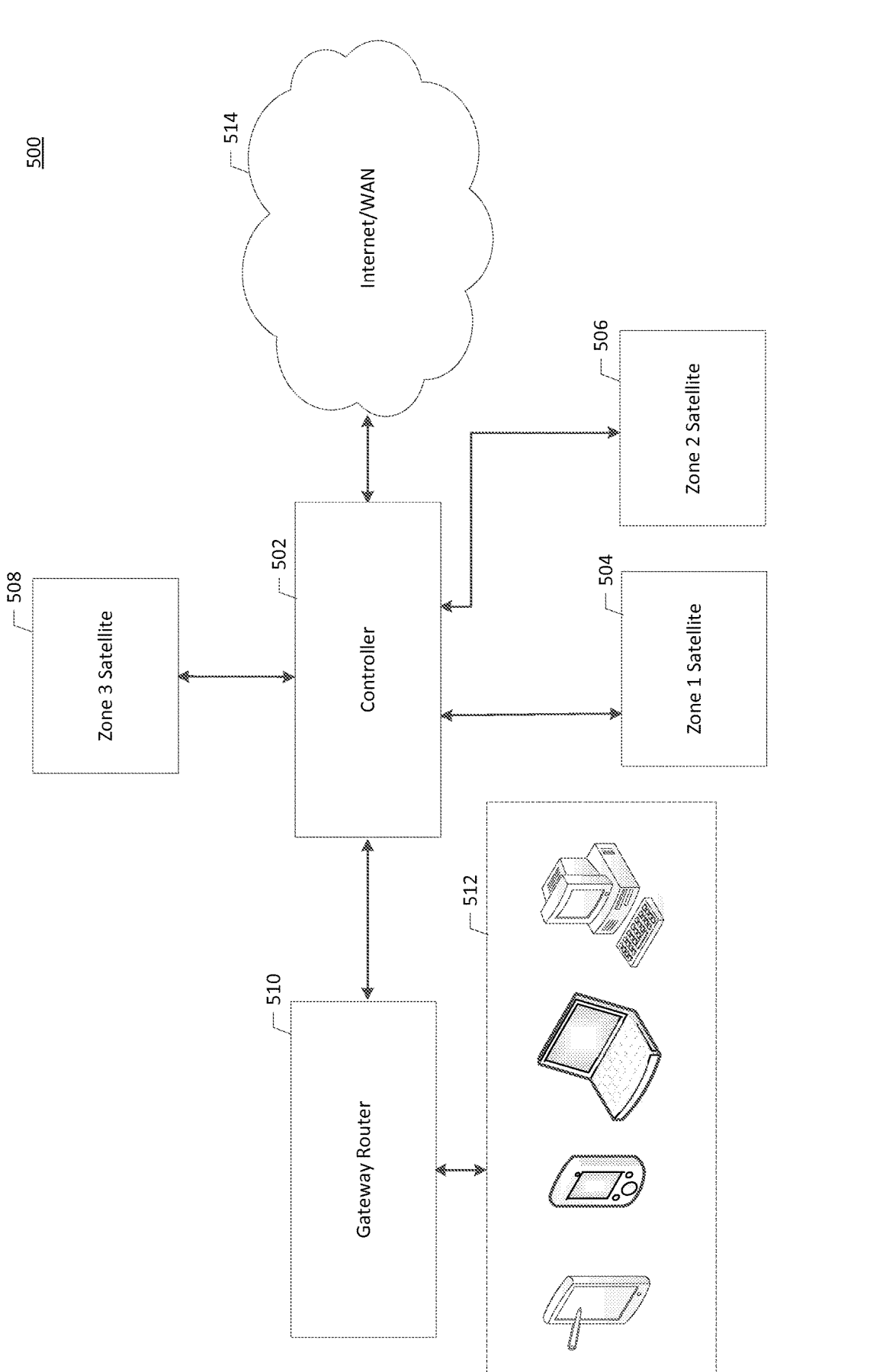
Figure 6:
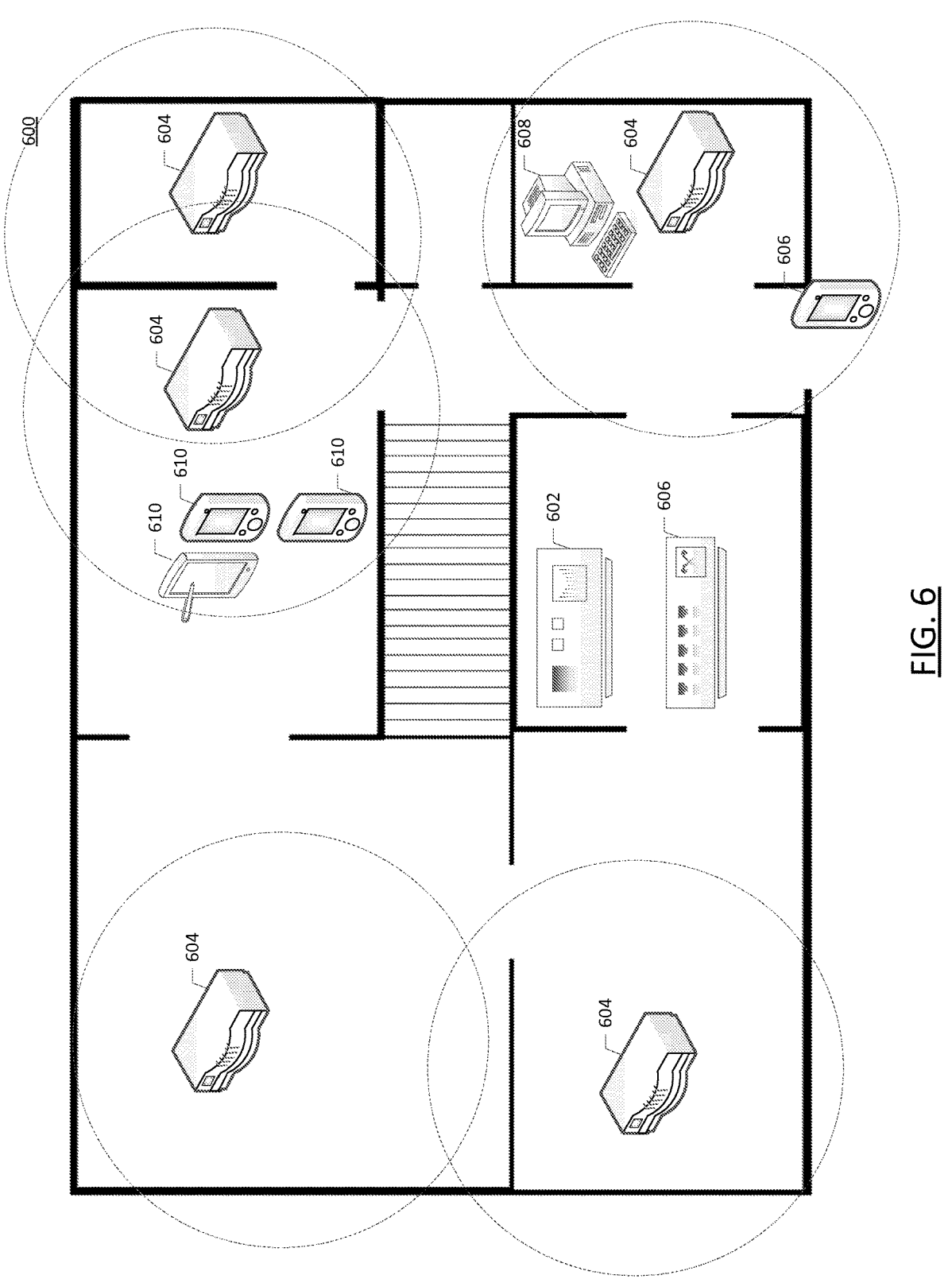
Figure 7:
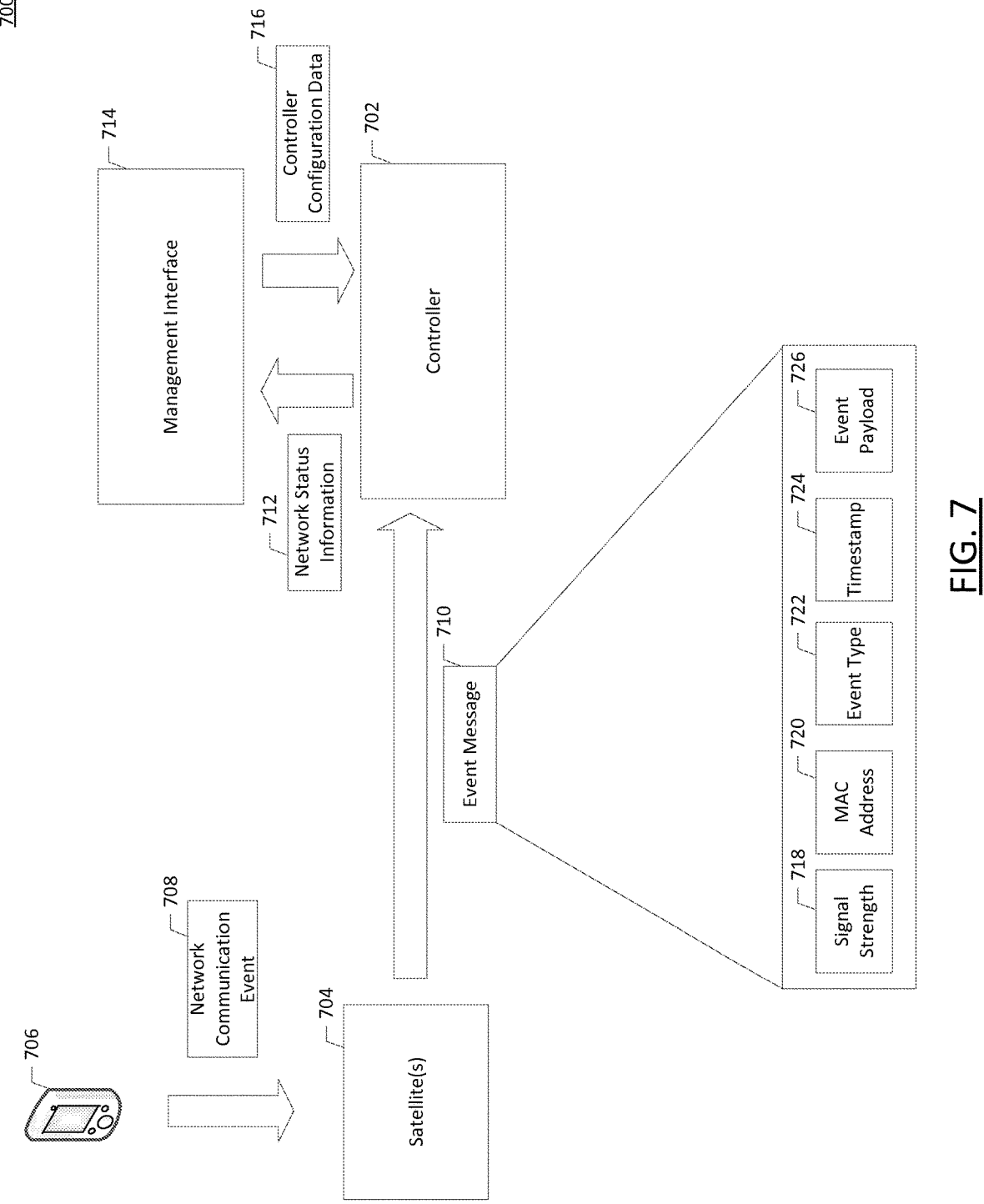
Figure 8:
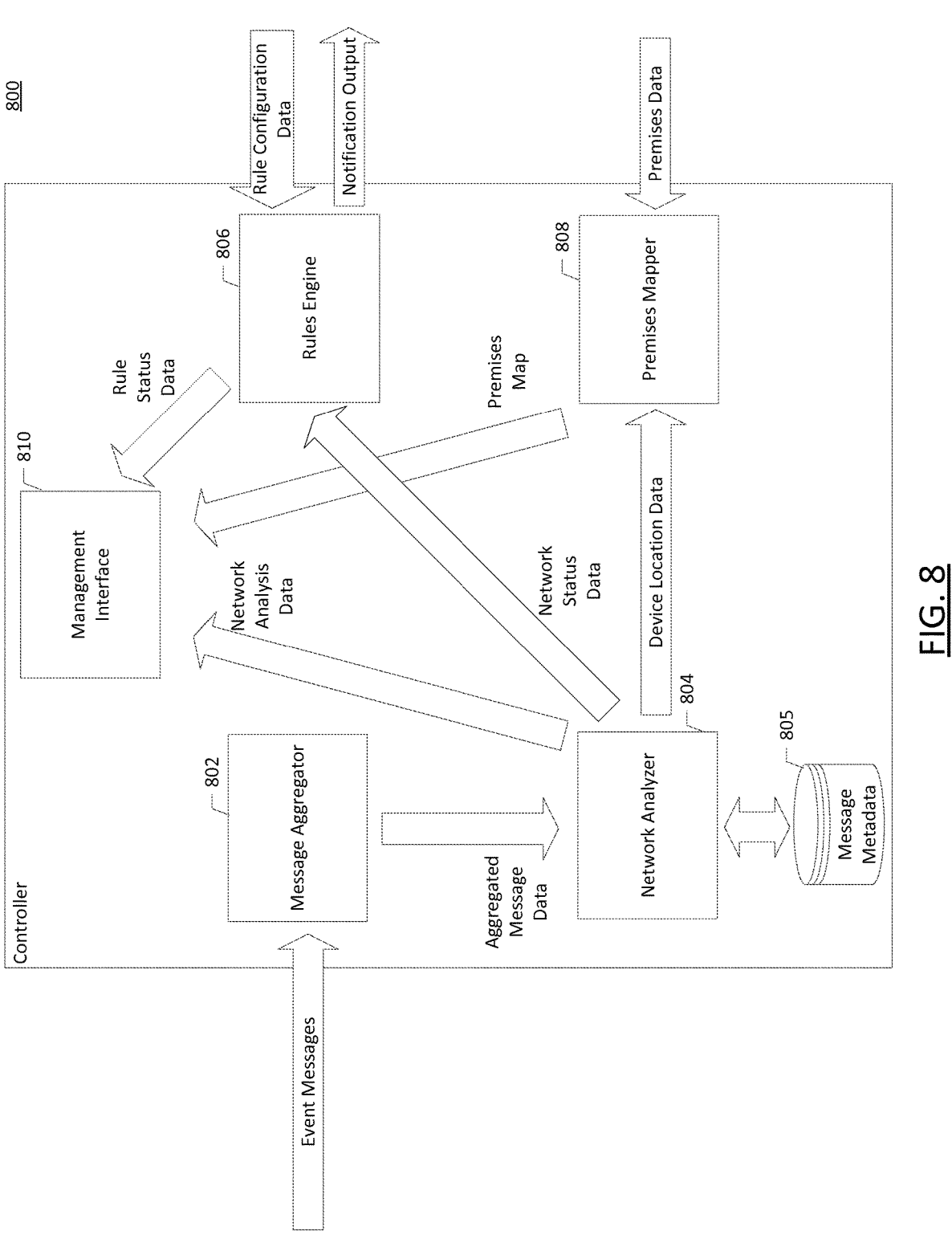
Figure 9:
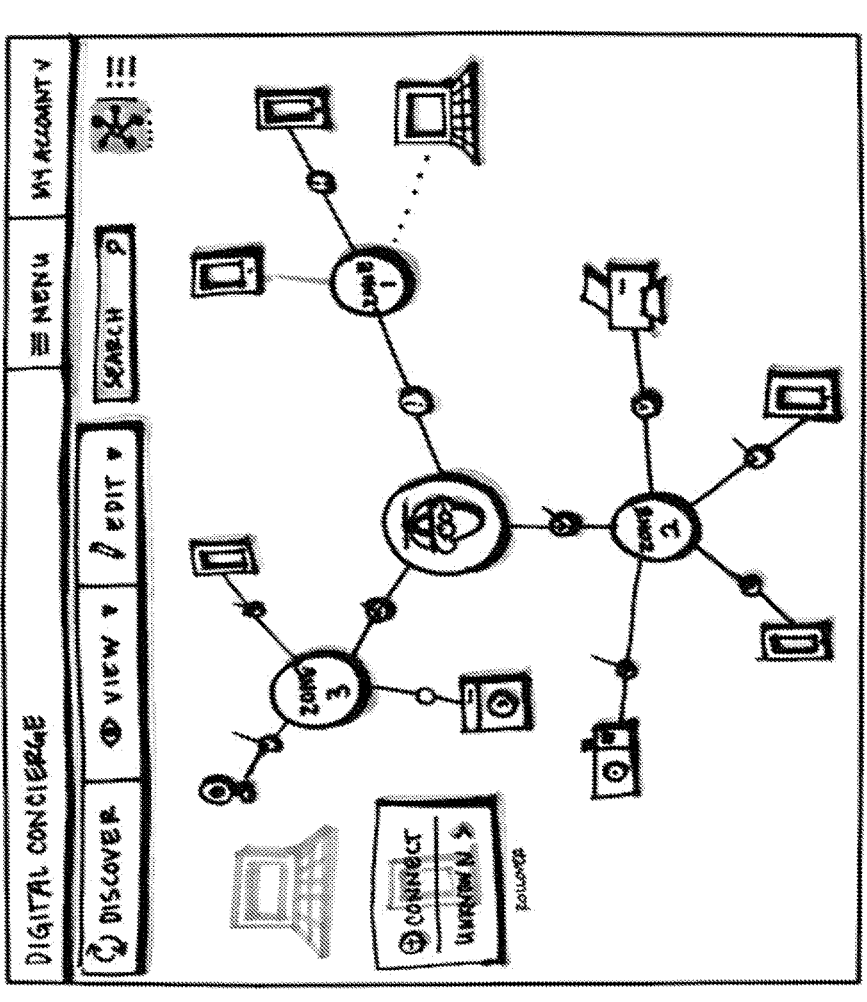
Figure 10:
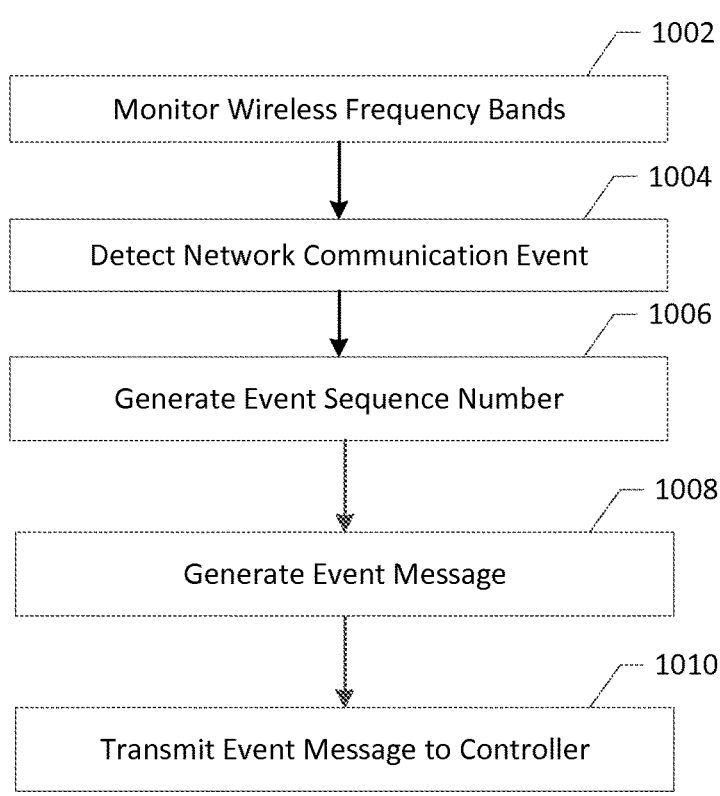
Figure 11:
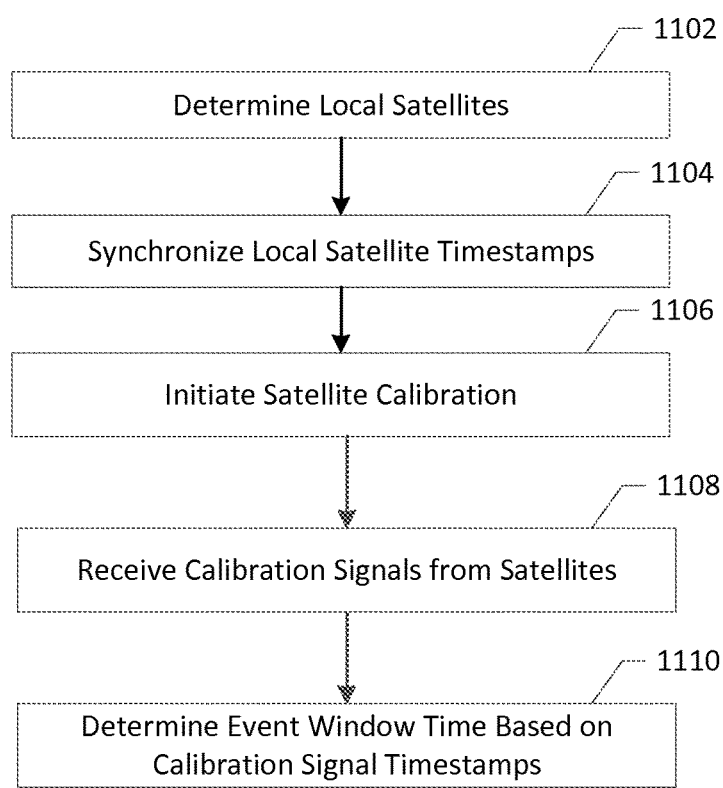
Figure 13:
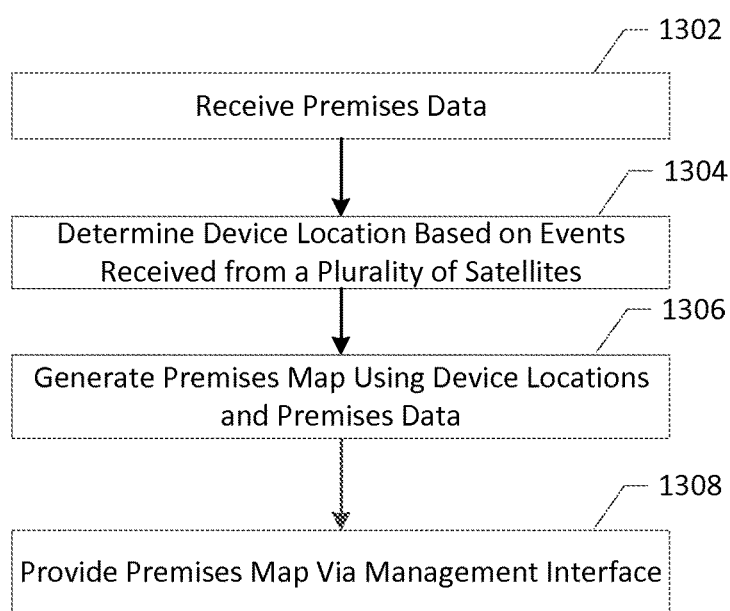
Figure 14:
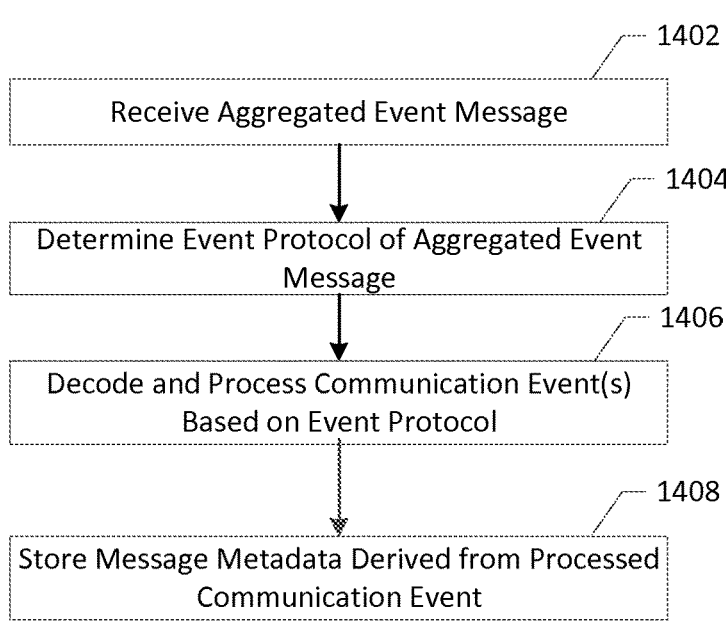
Figure 15:
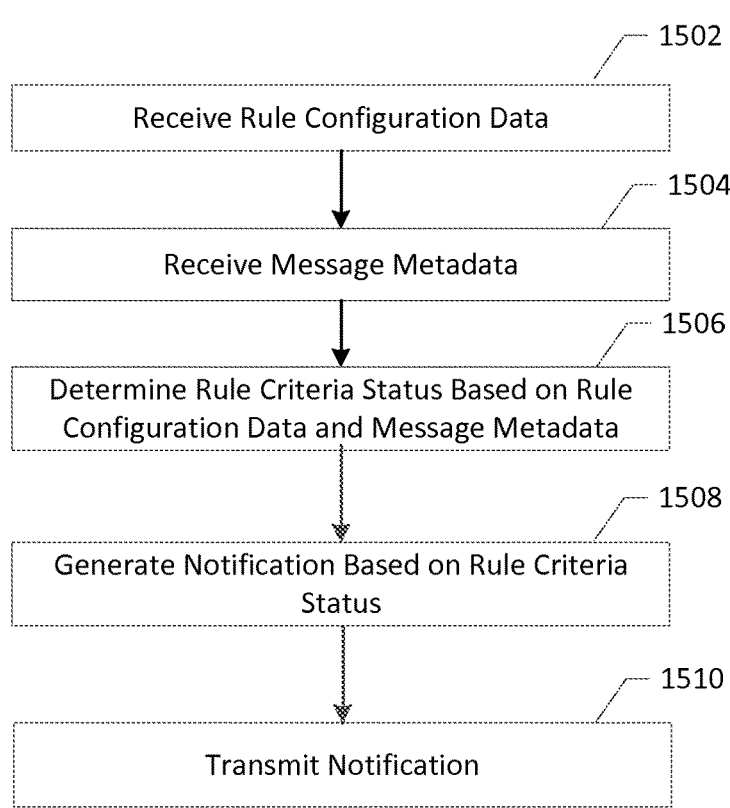
Figure 16:
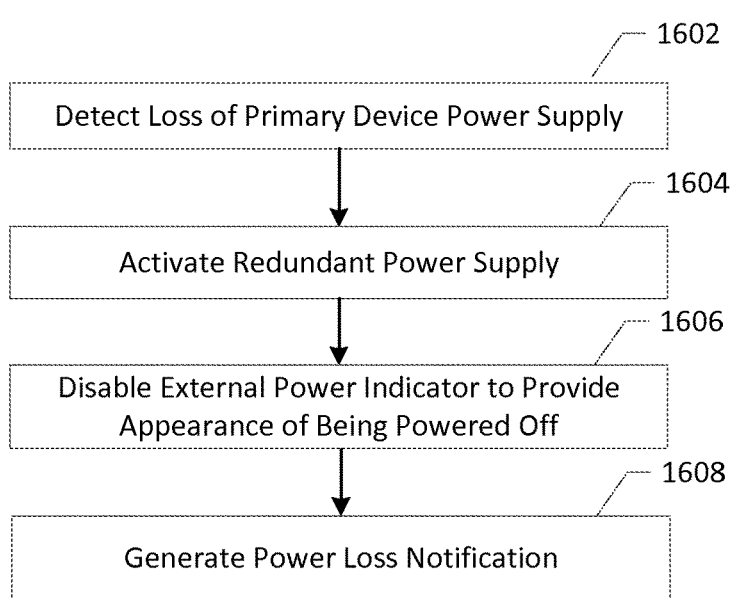
Figure 17:
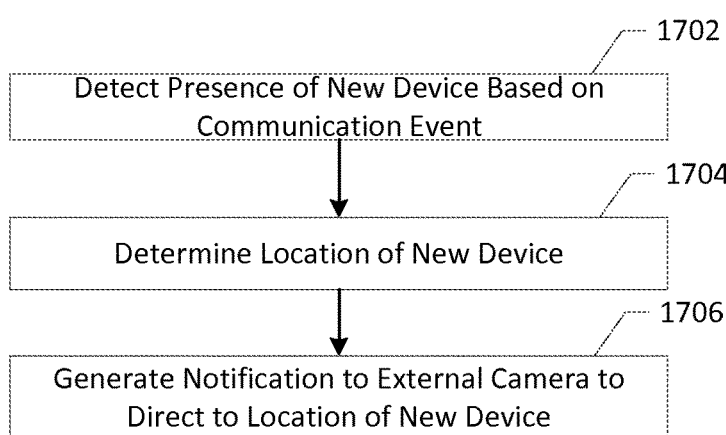

Having thus described certain example embodiments of the present disclosure in general terms, reference will now be made to the accompanying drawings, which are not necessarily drawn to scale, and wherein:

FIG. 1 illustrates an example network within which embodiments of the present invention may operate;

FIG. 2 illustrates a block diagram depicting an example of a controller device for implementing a network analysis system using special-purpose circuitry in accordance with some example embodiments of the present invention;

FIG. 3 illustrates a block diagram depicting an example of a satellite device for implementing a network analysis system using special purpose circuitry in accordance with some example embodiments of the present invention;

FIG. 4 illustrates an example of interconnectivity between components of a network analysis system and a home network in accordance with some embodiments of the present invention;

FIG. 5 illustrates an example of a network architecture employing a network analysis system in accordance with some embodiments of the present invention;

FIG. 6 illustrates an example of a premises map in accordance with some embodiments of the present invention;

FIG. 7 illustrates an example of a data flow interaction among components of a network analysis system in accordance with some embodiments of the present invention;

FIG. 8 illustrates an example of interactions among logical components of a controller device in accordance with some embodiments of the present invention;

FIG. 9 illustrates an example of an interface for interacting with a network analysis system in accordance with some embodiments of the present invention;

FIG. 10 illustrates a flow diagram depicting an example of a method for monitoring network communications using a satellite device in accordance with some embodiments of the present invention;

FIG. 11 illustrates a flow diagram depicting an example of a method for initializing satellite devices with a network analysis system in accordance with some embodiments of the present invention;

FIG. 12 illustrates a flow diagram depicting an example of a method for receiving network communication events from satellite devices in accordance with some embodiments of the present invention;

FIG. 13 illustrates a flow diagram depicting an example of a method for generating a premises map using a network analysis system in accordance with some embodiments of the present invention;

FIG. 14 illustrates a flow diagram depicting an example of a method for generating network metadata using a network analysis system in accordance with some embodiments of the present invention;

FIG. 15 illustrates a flow diagram depicting an example of a method for using a rules engine to generate notifications using a network analysis system in accordance with embodiments of the present invention;

FIG. 16 illustrates a flow diagram depicting an example of a method for employing tamper-proof security of a satellite device in accordance with some embodiments of the present invention; and FIG. 17 illustrates a flow diagram depicting an example of a method for using a network analysis system in conjunction with a camera device in accordance with embodiments of the present invention.

DETAILED DESCRIPTION

Overview

Various embodiments of the present invention are directed to improved apparatuses, methods, and computer readable media for providing a network analysis system. In this regard, embodiments may electronically detect the presence of devices on a home network and perform monitoring and management functions related to the detected devices. The monitoring functions may include monitoring the type and amount of network traffic to each device, monitoring the manner in which each device connects to the network, monitoring when a particular device connects to or disconnects from the network, or the like. Management functions may include enabling or disabling devices from connecting to the network, providing suggestions for device configuration changes to a user, alerting a user that a new device has connected, detecting and evaluating a network topology to suggest configuration changes, evaluating router security settings, and the like.

It should be readily appreciated that the embodiments of the methods, systems, devices, and apparatuses for providing a network analysis system may be configured in various additional and alternative manners to provide for monitoring and management of a home network based as described herein.

Technical Underpinnings and Implementation of Exemplary Embodiments

As home networks have become more and more common, more and more devices are capable of communicating on such networks. It is increasingly common for a given home network to include multiple devices in communication with one another via both wired and wireless communication mechanisms. Such devices may include not only common networking components such as routers and switches, but also "smart" televisions, home theater systems, printers, laptop computers, wearables, desktop computers, tablet computers, smartphones, and more. However, as more and more devices connect to a given network, detection and management of such devices may become increasingly complicated. Users may not always be able to easily determine whether a given connected device is authorized, or whether such a device is a rogue device that has circumvented network security. To address these concerns, the inventors have developed techniques, systems, and devices for detecting, monitoring, and managing devices connected to a home network via a digital concierge device.

Furthermore, the inventors have realized that even devices that do not completely "connect" (e.g., receive an assigned Internet Protocol address) to a network may still be detected by identifying connection requests and resource requests performed by such devices. The inventors have determined that it is possible to use this data and other network data to perform management and logging functions to inform users of various events. For example, embodiments of the present invention may detect the presence of an unauthorized device in proximity to the network and alert a user of the presence of the device. Other embodiments may log when authorized devices connect and disconnect from the network, such as to provide information as to when a child returns home after a curfew. Yet further embodiments may identify when an authorized device connects at or around the same time as an unauthorized device, indicating the presence of another person beside the user of the authorized device.

To this end, embodiments of the present invention may constantly monitor network activity for new devices entering into communication with a home network. This monitoring may be performed by various wired and wireless interfaces. For example, embodiments of the present invention may include a wireless antenna for monitoring wireless communications, and a wired network connection for monitoring data transmitted over a wired network. In some embodiments, a digital concierge may be located in the network topology between a router and the rest of the network or between the router and the Internet in order to monitor traffic flowing to or from the router.

Embodiments may monitor connectivity of devices and performance of the devices on the network to determine if each device is communicating optimally with other devices and with the internet.

Some embodiments may triangulate performance from multiple devices to determine optimal network speeds to support each device, such as by automatically implementing network Quality of Service (QoS) settings or by suggesting changes to a network topology to a user. Embodiments may further detect a wired and wireless topology (e.g., the connection infrastructure by which devices communicate with one another), evaluate the topology to determine possible performance optimization, and suggest the possible performance optimizations to the users. In some embodiments, the digital concierge may automatically make such optimizations by altering configuration settings on various devices coupled to the network. Embodiments may also interrogate a home router to determine whether the home router is configured in a proper security posture, that the router is properly updated with the latest software and firmware.

Some embodiments may implement a device detection perimeter (e.g., a "geo-fence") by detecting the presence of any device that attempts communication with a home network. Such detection may be performed at a low network layer, such as at the Open Systems Interconnection Model layer-2 "data link" layer, by sniffing devices that come into range of a wireless router and generate network requests, such as dynamic host configuration protocol (DHCP) requests or internet protocol version 6 (IPV6) router discovery packets. Embodiments may detect devices and alter administrators of such detected devices and monitor the activity of such devices as long as such devices are detectable on the home network. It should be appreciated that embodiments may not require such devices to acquire routable (e.g., IP) addresses on the network, and such activity may be monitored based only upon lower level communications such as the OSI layer-2 communications described above. Device detection in this manner may be employed to support various use cases, including but not limited to detection of when a user enters or leaves a room of the household, detection of when a user returns home from work, school, or a night out, detection of an unauthorized device at an unusual time (e.g., after 2 am), or the like. Such use cases may be employed to, for example, track when a child returns home after curfew, determine when a child has a visitor in their room for more than a threshold amount of time, detect intruders after dark, or the like. Various actions may be taken in response to detection of these scenarios, including notifying a particular user or administrator, activating a home security system, or the like.

Some embodiments may provide low cost, small devices to capture network traffic and relay such traffic to a central location for processing and analysis. For example, some embodiments may include a "Raspberry Pi" device. In some embodiments, removal of a power source may cause the device to disable onboard light emitting diodes (LEDs) but allow the device to continue operating using battery power. In some embodiments, multiple such devices may be employed to triangulate the position of a particular network device, or such devices may be employed in parallel for redundancy in the event of a failure or intentional disconnection by an individual attempting to defeat the system.

Embodiments may also identify when known devices (e.g., previously detected devices) have been absent from a network for a period of time. In such cases, embodiments may generate a notification allowing a user to indicate whether the device has been sold, has been removed from service, has broken, or the like. In some cases, embodiments may identify a resale value of a device that has not connected for a period of time, and assist a user with reselling the unused device such as by providing an interface for facilitating shipping of the device to a depository and paying the user for the device.

Embodiments may also provide systems and techniques for managing device warranty information. For example, embodiments may provide an interface for the user to indicate which detected devices are owned by the user, when such devices were purchased, and when device warranties expire. Embodiments may also allow for specification by the user of the circumstances under which the device was purchased (e.g., whether a particular credit card was used or whether the user purchased an extended warranty plan) and automatically update warranty information. For example, embodiments may detect that the user used a credit card with a benefit that doubles a warranty upon purchasing a device (e.g., by monitoring user transaction data, such as by an online banking or financial service aggregation system, or by allowing the user to select which credit card they used) and automatically update warranty information for the device to reflect the doubled period. Embodiments may also notify the user of a mechanism for submitting a warranty claim (e.g., by providing a phone number or contact information), or provide a customer service representative interface to initiate the claim. Embodiments may also notify the user of events such as product recalls, free services, and/or other services that are available for devices detected on the network (e.g., a wiring protection plan that offers protection for any devices connected to a covered device).

Some embodiments may allow for information about the attached devices to be communicated for the purpose of providing warranties or service plans. For example, information may be gathered about the devices connected to a user's home network and communicated to a warranty or insurance provider to offer the user a warranty or insurance package to cover one or more of the detected devices. In some embodiments, the user may be provided with a discount based on the number of devices or type of devices covered by the offered warranty or insurance.

In order to implement the improved systems described herein, the inventors have identified a variety of data sources and processing techniques and algorithms that may be employed to support detection, monitoring, and management of devices on a home network. To this end, the inventors have conceived of a variety of communications techniques, application programming interfaces, and data interfaces for obtaining such data. By employing these improved techniques, the inventors have reduced the processing overhead, number of applications, and number of man-hours necessary to implement such systems. As a result, example embodiments of the present invention provide the technical benefit of a flexible, streamlined system for evaluating, managing, and monitoring a home network and attached devices. The inventors have also developed systems, methods, and devices for network traffic monitoring and generation of network analytics. Such systems, methods, and devices may be used to improve network performance by identifying network bottlenecks, monitoring for network security breaches, and suggesting and/or implementing connectivity changes of the network.

Additionally, the inventors have created new interfaces, methods, and techniques for accessing home network data and managing home networks and attached devices in a straightforward, flexible manner. These improved interfaces reduce the amount of user input required to view and manage a home network by organizing information in a novel way. As such, embodiments of the present invention also provide the technical benefit of an improved display and user interface for detecting devices in communication with a home network, and managing and monitoring the home network and/or attached devices.

System Architecture

Methods, apparatuses, and computer program products of the present invention may be embodied by any of a variety of devices. For example, the method, apparatus, and computer program product of an example embodiment may be embodied by a networked device, such as a server or other network entity, configured to communicate with one or more devices, such as one or more client devices. Additionally or alternatively, the computing device may include fixed computing devices, such as a personal computer or a computer workstation. Still further, example embodiments May be embodied by any of a variety of mobile terminals, such as a portable digital assistant (PDA), mobile telephone, smartphone, laptop computer, tablet computer, or any combination of the aforementioned devices.

In this regard, FIG. 1 discloses an example computing system within which embodiments of the present invention may operate. A home network 104 may include a plurality of satellite devices 108 and a plurality of network devices 110 in communication via the network 104 (e.g., a home network with one or more routers). A controller device 102 may also communicate with the network 104 to detect, monitor, and manage the network devices. The satellite devices 108 may notify the controller 102 of the occurrence of network events, such as new network devices 110 joining the network, communicating on the network, leaving the network, or the like. Although the instant example embodiment is described with respect to a system incorporating both satellite devices and a controller device, it should be appreciated that in some embodiments some or all of the functionality of the satellite device may be integrated within the controller device. For example, a controller device 102 may monitor network communication events in the same manner as described herein with respect to the satellite device 108. In embodiments where a limited physical area is monitored (e.g., an apartment), the use of satellite devices may thus be unnecessary to achieve full coverage for monitoring of network communications. A router 106 may facilitate a connection to the Internet for the controller 102 and the network devices 108. Although the controller 102 is depicted in FIG. 1 as communicating with the network separately from the router 106, it should be appreciated that some embodiments may feature the router 106 connecting through the controller 102 to facilitate monitoring of traffic on the network by the controller 102.

In some embodiments, one or more of the network devices 108 may communicate with the controller 102 to receive data about the network 104 and connected devices 102, 106, 108. For example, an "app" executing on a user's smartphone may interface with the controller 102 to provide the user with information about connected devices, network topology, suggested optimizations, and the like. The app may also provide the user with an interface to control the operation of the controller 102 (e.g., manage configuration settings for device detection, monitoring, and management), characteristics of the network (e.g., QoS settings, subnet configurations, address assignment settings), or other network devices 108.

Example of a Controller Apparatus for Implementing Embodiments of the Present Invention The controller device 102 may be embodied by one or more computing systems, such as the apparatus 200 depicted in FIG. 2. As illustrated in FIG. 2, the apparatus 200 may include a processor 202, a memory 204, input/output circuitry 206, communications circuitry 208, network analysis circuitry 210, device management circuitry 212, and remote management circuitry 214. The apparatus 200 may be configured to execute the operations described above with respect to FIG. 1. Although these components 202-214 are described with respect to functional limitations, it should be understood that the particular implementations necessarily include the use of particular hardware. It should also be understood that certain of these components 202-214 may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus should therefore be understood to include particular hardware configured to perform the functions associated with the particular circuitry as described herein.

The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the apparatus 200 may provide or supplement the functionality of particular circuitry. For example, the processor 202 may provide processing functionality, the memory 204 may provide storage functionality, the communications circuitry 208 may provide network interface functionality, and the like.

In some embodiments, the processor 202 (and/or coprocessor or any other processing circuitry assisting or otherwise associated with the processor) may be in communication with the memory 204 via a bus for passing information among components of the apparatus. The memory 204 may be non-transitory and may include, for example, one or more volatile and/or non-volatile memories. In other words, for example, the memory may be an electronic storage device (e.g., a computer readable storage medium). The memory 204 may be configured to store information, data, content, applications, instructions, or the like, for enabling the apparatus to carry out various functions in accordance with example embodiments of the present invention.

The processor 202 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 202 may be configured to execute instructions stored in the memory 204 or otherwise accessible to the processor. Alternatively or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present invention while configured accordingly. Alternatively, as another example, when the processor is embodied as an executor of software instructions, the instructions may specifically configure the processor to perform the algorithms and/or operations described herein when the instructions are executed.

In some embodiments, the apparatus 200 may include input/output circuitry 206 that may, in turn, be in communication with processor 202 to provide output to the user and, in some embodiments, to receive an indication of a user input. The input/output circuitry 206 may comprise a user interface and may include a display and may comprise a web user interface, a mobile application, a client device, a kiosk, or the like. In some embodiments, the input/output circuitry 206 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

The communications circuitry 208 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

The network analysis circuitry 210 includes hardware configured to detect devices on a network and monitor network conditions. For example, the network analysis circuitry 210 may interface with the communications circuitry 208 to detect particular network packets received on the home network. For example, devices may be detected by analyzing the network data to detect DHCP requests, IPV6 router discovery packets, address resolution protocol (ARP) data, or the like. The network analysis circuitry 210 may also detect and monitor network bandwidth, network connection and disconnection events, IP conflicts, and the presence of certain types and quantities of data packets. In some embodiments the device detection circuitry 210 may detect network data in a "promiscuous" manner, where all packets are received and analyzed even if the concierge device is not necessarily the intended recipient. Such network packets may be obtained directly from the communications circuitry 208, or stored on the apparatus 200 prior to analysis, such as via the memory 204. Identification of devices from the network packet data and analysis of the network may be performed by processing circuitry, such as the processor 202, and detected devices may be stored in an electronic format in the memory 204. In some embodiments, the network analysis circuitry 210 may generate electronic information notifying the device management circuitry 212 of newly detected devices, devices that have disconnected, a connection duration, a current network status, or the like.

It should also be appreciated that, in some embodiments, the network analysis circuitry 210 may include a separate processor, specially configured field programmable gate array (FPGA), or application specific interface circuit (ASIC) in addition to the processor 202 to detect devices on the network. The network analysis circuitry 210 is therefore implemented using hardware components of the apparatus configured by either hardware or software for implementing these planned functions.

The device management circuitry 212 includes hardware configured to manage devices detected on the network and take appropriate action in response to certain criteria. To this end, the device management circuitry 212 may include a processor or processing circuitry, such as the processor 202, to implement a rules engine or other application to take certain actions in response to detection of certain criteria. For example, the device management circuitry 212 may be responsible for taking certain action in response to network conditions detected by the network analysis circuitry 210. For example, the device management circuitry 212 may provide notifications to the user via a user interface (e.g., through the communications circuitry 208 or the input/output circuitry 206) provided by the apparatus 200. The device management circuitry 212 may also determine characteristics of the network based on the data received from the network analysis circuitry 210 and provide a user with suggested optimizations or troubleshooting measures to address any detected problems, improve performance, or the like. In this regard, the device management circuitry 212 may implement a rules engine or other decision-making component for taking appropriate action in response to particular network conditions. An example of such a rules engine component is described further below with respect to FIG. 8. The device management circuitry 212 may also identify types of devices based on observed network traffic data. For example, the device management circuitry 212 may identify protocol types, device identifiers, and other device information contained within network traffic headers for data sent to or from those devices to attempt to match the network traffic data to known device types. As a result, the device management circuitry 212 may, for example, determine that a particular device is a smart phone, tablet computer, wireless speaker, wireless mouse, "smart" appliance (e.g., refrigerator, washer, or dryer with network connectivity), or other device type.

The device management circuitry 212 may also maintain a data structure indicating which devices are detected. Device information may be stored within the data structure to indicate the device type, various network metrics associated with the device (e.g., bandwidth used, security logs, etc.) and whether the device is known and/or authorized. For example, when a new device is detected an interface may be presented to a user (e.g., as provided by the remote management circuitry 214) to name the device, indicate a device type, and/or indicate that the newly detected device is authorized.

In yet further embodiments, the device management circuitry 212 may be operable to detect when an unauthorized device has entered the network, to detect when a device has failed to connect by a particular time (e.g., a teenage child's smart phone has not connected to the home network by a particular time associated with a curfew), or the like. Although the processor 202 may be employed to perform device management, it should also be appreciated that, in some embodiments, the device management circuitry 212 may include a separate processor, specially configured field programmable gate array (FPGA), or application specific interface circuit (ASIC) to perform such tasks. The device management circuitry 212 is therefore implemented using hardware components of the apparatus configured by either hardware or software for implementing these planned functions.

The remote management circuitry 214 includes hardware configured to provide a remote "dashboard" type interface for visualizing data generated by the device management circuitry 212 and the network analysis circuitry 210. In this manner, the remote management circuitry 214 may provide data via a local server application executing on the apparatus 200, or data may be provided to a remote computer (e.g., a local router or a cloud-based implementation) to allow for viewing of the data generated by the apparatus 200. Such information may include, for example, data related to devices connected to the network, including device identifications, network configuration settings, troubleshooting data, warranty data (e.g., where device serial numbers are accessible over the network), and the like. The remote management circuitry 214 may also include hardware configured for receiving input from a remote interface, such as configuration of one or more rules and notifications associated with a rules engine.

In some embodiments, the remote management circuitry 214 may also provide an interface that allows for entry of warranty data. For example, the warranty management circuitry 214 may provide an interface allowing a user to enter warranty information for one or more devices connected to the network. Example warranty information may include whether a particular device is owned by the user, where the user purchased the device, the amount paid for the device, the payment method used to purchase the device, the brand or benefits associated with a credit card used to purchase the device, or the like. In some embodiments, such warranty information may be provided by the user through a barcode scanner, through scanning a receipt, by allowing a user to input a SKU, or the like. Additionally or alternatively, in some embodiments, the remote management circuitry 214 may determine warranty information directly from the one or more devices detected by the network analysis circuitry 210.

In some embodiments, the remote management circuitry 214 may automatically register detected devices for warranty coverage with their manufacturer, or provide an interface to the user for doing so. In some embodiments, the remote management circuitry 214 may provide users with the ability to purchase new or additional coverage based on which devices are detected. In some embodiments, the warranty coverage may be provided as a "bundle" providing coverage on a plurality of the devices attached to the network as detected by the network analysis circuitry 210. Some embodiments of the invention may assist with determination of the value of one or more networked devices, and display those determined values via an interface. For example, embodiments may determine the model of particular devices, assess the condition of the particular devices, and determine a value of the particular devices based on a database lookup using the model and condition. Some embodiments may allow for sale or trade of these devices according to the determined values. Some embodiments may allow trade-in of one or more devices in exchange for warranty coverage of other networked devices. For example, a user smartphone may have an identified value of $80, and embodiments may programmatically facilitate the trade-in of the device in exchange for warranty coverage on, for example, another smartphone, a television, and a tablet computer identified on the home network.

In some embodiments, the remote management circuitry 214 may provide an interface for sending or initiating a claim for a device that is covered by a warranty. For example, the remote management circuitry 214 may include an interface allowing a user to provide information to a customer service representative. In some embodiments, such information is automatically gathered and/or generated by the apparatus 200, obviating the need for the user to enter such information in an interface.

The remote management circuitry 214 may perform these functions using processing circuitry, such as the processor 202. Although the processor 202 may be employed to perform remote management functions, it should also be appreciated that, in some embodiments, the remote management circuitry 214 may include a separate processor, specially configured field programmable gate array (FPGA), or application specific interface circuit (ASIC) to perform such tasks. The remote management circuitry 214 is therefore implemented using hardware components of the apparatus configured by either hardware or software for implementing these planned functions.

As will be appreciated, any such computer program instructions and/or other type of code may be loaded onto a computer, processor or other programmable apparatus's circuitry to produce a machine, such that the computer, processor other programmable circuitry that execute the code on the machine create the means for implementing various functions, including those described herein.

It is also noted that all or some of the information presented by example interfaces described herein can be based on data that is received, generated and/or maintained by one or more components of apparatus 200. In some embodiments, one or more external systems (such as a remote cloud computing and/or data storage system) may also be leveraged to provide at least some of the functionality discussed herein.

Example of a Satellite Apparatus for Implementing Embodiments of the Present Invention The satellite device 108 may be embodied by one or more computing systems, such as the apparatus 300 depicted in FIG. 3. As described above, a satellite device May be one of a plurality of devices spread about a physical area to gather data about a network to be reported to a controller. In this manner, the satellite device may be configured to passively listen to network traffic on various frequency bands (e.g., the 802.11 protocol suite, Bluetooth, ZigBee, and other wireless protocols) and to detect communication events occurring on the network. Communication events may be reported to a controller, such as the controller described above with respect to FIGS. 1 and 2. As illustrated in FIG. 3, the apparatus 300 may include a processor 302, a memory 304, input/output circuitry 306, communications circuitry 308, network monitoring circuitry 310, controller interface circuitry 312, and power management circuitry 314.

Although these components 302-314 are described with respect to functional limitations, it should be understood that the particular implementations necessarily include the use of particular hardware. It should also be understood that certain of these components 302-314 may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus should therefore be understood to include particular hardware configured to perform the functions associated with the particular circuitry as described herein.

The processor 302, memory 304, and input/output circuitry 306 may be configured similarly to as described above with respect to FIG. 2, and duplicate description is omitted in the interests of brevity.

The communications circuitry 308 of the apparatus 300 may also be implemented similarly to the communications circuitry 208 of the apparatus 200. However, it should be appreciated that, in some embodiments, the communications circuitry 308 may include additional or alternative hardware configured to detect radio frequency transmissions on various frequency bands and according to various wireless protocols. Such hardware may be configured to detect communication events happening in proximity to the apparatus 300 and to notify the network monitoring circuitry 310.

The network monitoring circuitry 310 includes hardware configured to identify network communication events. These network communication events may be detected through the use of the communications circuitry 308, and then forwarded to the controller interface circuitry 312 to manage transmission to a controller device. Network communication events may include any transmission detected by the apparatus 300. For example, the apparatus 300 may detect transmissions from devices announcing their presence to all devices in proximity, devices joining (or attempting to join) a wireless network, devices requesting and receiving an Internet Protocol Address, devices in communication with one another (e.g., transmission of data packets), or the like. In some embodiments, the network monitoring circuitry 310 may forward all received network communication events to a controller, while in other embodiments the network monitoring circuitry 310 may strip out message data payloads in order to reduce the amount of bandwidth consumed in transmitting the network communication events to the controller. For example, event messages sent to the controller to notify the controller of the network communication events may include only a header of the detected network communication event.

The controller interface circuitry 312 includes hardware configured to notify a controller of network communication events through the transmission of event messages. The controller interface circuitry 312 may also perform other communications with the controller, such as initial pairing between a controller and the apparatus 300. The controller interface circuitry 312 may, in some embodiments, communicate with the controller via various wireless network protocols, including but not limited to the 802.11 suite, Bluetooth, ZigBee, and/or the like. The controller interface circuitry 312 may construct event messages based on network communication events detected by the network monitoring circuitry 310. An example of a process for generating and further below with respect to FIG. 7. The controller interface circuitry 312 may utilize components of the communications circuitry 308 to effect the transmission of the event messages to the controller, though it should also be appreciated that in some embodiments the controller interface circuitry 312, the network monitoring circuitry 310, and the communications circuitry 308 may each include stand-alone hardware. For example, different antennae, transceivers, and the like may be employed for listening for various types of network traffic to identify network communication events occurring between various devices on the network than hardware utilized to communicate between the apparatus 300 and the controller.

The power management circuitry 314 includes hardware configured to manage a process of providing power to the apparatus 300. In particular, the power management circuitry 314 includes hardware configured to enable a primary power source (e.g., Alternating Current (AC) power) and a backup power source (e.g., a battery backup). Since a network analysis system incorporating satellite devices such as the apparatus 300 may frequently be employed for security purposes (e.g., to detect the presence of unauthorized devices and/or unauthorized network usage), satellite devices may be subject to attempts to disable their functionality by removing a power source, such as being unplugged from the wall. In order to continue to provide the functionality of the device even when unplugged, the power management circuitry 314 may facilitate failover to a backup power source, such as a battery. In some embodiments, the apparatus 300 may be designed as a low power device that is capable of operating for an extended period of time off battery power (e.g., 24 hours). Upon transitioning to the battery backup, the power management circuitry 314 may disable external power indicators (e.g., a light emitting diode (LED) or other visual power indicator), to give the appearance that the apparatus 300 has been powered off. Disabling such external power indicators may cause a wrong-doer to believe that the device has been disabled, and also provide the benefit of reducing power consumption of the device while it is operating on battery power.

As will be appreciated, any such computer program instructions and/or other type of code may be loaded onto a computer, processor or other programmable apparatus's circuitry to produce a machine, such that the computer, processor other programmable circuitry that execute the code on the machine create the means for implementing various functions, including those described herein with respect to the apparatus 200 and the apparatus 300.

As described above and as will be appreciated based on this disclosure, embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Having now described apparatuses configured to implement and/or support implementation of various example embodiments, features of several example embodiments will now be described. It will be appreciated that the following features are non-limiting examples of features provided by some example embodiments. Further, it will be appreciated that embodiments are contemplated within the scope of disclosure that implement various subsets or combinations of the features further described herein. Accordingly, it will be appreciated that some example embodiments may omit one or more of the following features and/or implement variations of one or more of the following features.

Exemplary Network Architectures

FIG. 4 depicts an exemplary embodiment of a network architecture 400 highlighting communications between components of a network analysis system in accordance with embodiments of the present invention. The network architecture 400 includes a gateway router 410 in communication with a controller 402, a plurality of satellite devices 404-408, and a plurality of network devices 412-420. Each of the satellite devices 404-408 may be configured to detect network communication events within a particular physical area. For example, a first satellite device 404 may have a first detection area 422, a second satellite device 406 may have a second detection area 424, and a third satellite device may have a third detection area 426. Although only the satellite devices 404-408 are illustrated as having detection areas, it should be appreciated that, in some embodiments, the controller 402 may also have a detection area for detecting network devices.

Each of the satellite devices 404-408 may be operable to detect network communication events to and from network devices located within their respective detection areas by monitoring wireless communications. Upon detecting a network communication event, the satellite device 404-408 may notify the controller 402 of the network communication event over the network. The satellite devices 404-408 may transmit network communications events to the controller through the use of the same network upon which the network devices are communicating, a network provided by the gateway router 410. Alternately, in some embodiments the satellite devices 404-408 may communicate the network communication events to the controller 402 via an alternate network that exists separately from that provided by the gateway router (e.g., a mesh network containing the satellite devices and controller).

As described above, each of the satellite devices 404-408 may detect wireless network communication events occurring to and from network devices 412-420 located within their detection areas. For example, as depicted in FIG. 4, a satellite device 404 for a first detection area (dubbed "zone 1") 422 may detect network communication events related to network devices 412, 414, and 416. A satellite device 406 for a second detection area (dubbed "zone 2") 424 may detect network communication events related to network devices 414, 416, and 418. A satellite device 408 for a third detection area (dubbed "zone 3") 426 may detect network communication events related to the network device 420.

The satellite devices 404-408 may be configured to listen "promiscuously" such that they identify local wireless traffic in their physical area even for devices that are not associated with the network by which the satellite devices 404-408 communicate with the controller 402 and/or gateway router 410. For example, the satellite devices 404-408 may listen for various transmissions including communications via other networks (e.g., cellular networks, Bluetooth, other Wi-Fi networks). For example, the satellite devices 404-408 may listen for initial connection requests, device identification signals, and other transmissions in addition to communications that occur on the same network by which the satellite devices 404-408 communicate with the controller 402 and/or gateway router 410.

Since network devices 414 and 416 are located within two detection areas, embodiments may attempt to triangulate the location of those devices by providing signal strength data related to each device to the controller 402 and using received signal strength indicator (RSSI) location detection techniques. It should also be appreciated that even devices that are only within a single detection area may have a location determined based on RSSI techniques, though more data points received from overlapping detection areas may improve the accuracy of the location measurement.

The gateway router 410 may be any device configured to enable network communications among multiple network devices. Although the instant examples are generally described with respect to wireless devices, it should be appreciated that some embodiments may relate to wired devices in communication over a network and that various network analysis services may also be employed for these wired devices, though it should also be appreciated that certain functionalities of the instant embodiments (e.g., location tracking based on RSSI) are predicated on the use of wireless devices. The gateway router 410 may thus include hardware configured to provide wired and/or wireless communications. In some embodiments, the gateway router 410 provides for network communication between the satellite devices 404-408 and the controller 402, while in other embodiments the satellite devices 404-408 may communicate with the controller directly. In some embodiments, the functionality of the controller 402 may be integrated with the functionality of the gateway router 402, such that a single physical device both enables network communications among the devices of the network and also performs network analysis functions as described herein with respect to the various embodiments of the present invention.

FIG. 5 depicts an example of an additional embodiment of a network architecture, where a controller 502 is physically disposed between a gateway router 510 and the Internet or other wide area network (WAN) 514. As described above, one or more network devices 512 may communicate over a network established by the gateway router 510, and a set of satellite devices 504-508 may detect network communication events and communicate those network communication events to the gateway 502.

The controller 502 is disposed between the gateway router 510 and the Internet/WAN 514 such that network traffic from the gateway router 510 to computing nodes located on the Internet/WAN 514 passes through the controller 502. Generally, this may be accomplished through the use of a physical cable between the controller 502 and the gateway router 510 and another cable between the controller 502 and a modem, fiber endpoint, or other Internet/WAN access device, though in some embodiments such a pass-through may be implemented in software (e.g., through the use of routing tables) or wirelessly (e.g., as a wireless relay).

Disposing the controller 502 in this manner advantageously ensures that network traffic from each of the network devices 512 can be monitored and analyzed by the controller 502, even if the traffic occurs over wired connections that do not necessarily interact with a satellite device.

Alternately, in some embodiments a different device other than the controller 502 may be disposed between the gateway router 510 and the Internet/WAN 514. For example, a specially configured satellite device may include a ports for implementing a physical cable pass-through as described above, and the specially configured satellite device may detect network communication events and report event messages to the controller 502 in a similar manner to the other satellite devices described above.

Exemplary Premises Map

FIG. 6 illustrates an example use of a network analysis system to generate a premises map 600 in accordance with some embodiments of the present invention. By disposing a series of satellite devices 604 through a home, it may be possible to generate a map of network devices throughout the premises by taking into account the respective detection areas of each satellite device and the network devices which are visible to those satellite devices. The premises map 600 depicts a controller 602, a series of satellite devices 604, a gateway router 606, and a plurality of network devices 608. The premises map 600 further depicts a floor plan of a building, such as a home, office, or the like.

To generate the premises map 600, embodiments may receive location data for each satellite device 604 during an initial setup and/or calibration of that satellite device. For example, a user may utilize an interface to draw a simple floor plan and indicate a location of each satellite device (e.g., through the placement of drag and drop icons) on a position on the drawn floor plan corresponding to the position of the satellite device in the building.

The premises map 600 may also illustrate detected relationships among network devices. For example, the premises map 600 may include icons, animations, or other visual displays indicating network connections of particular devices to particular routers or access points (e.g., in a scenario where a user has multiple wireless access points), or to show wired connections between network devices as detected by satellite devices or through data provided by direct communication with network routers.

Exemplary Data Flow Among Components of a Network Analysis System

FIG. 7 depicts an example of data flow 700 among components of a network analysis system in accordance with some embodiments of the present invention. In particular, the data flow 700 illustrates how a network device 706 may be monitored by one or more satellites 704 to identify network communication events 708 associated with the network device 706. The satellites 704 may generate one or more event messages 710 based on the network communication events and transmit the event messages to a controller 702. The controller 702 may analyze the received event messages 710 to determine network status information 712. The controller 702 may provide the network status information 712 to a management interface 714, such as a "dashboard" type interface that displays the status of each device connected to the network, troubleshooting information for those devices, warranty information for those devices, a location for each device, and the like. The management interface 714 may further provide controller configuration data 716 to the controller 702 to configure the various functionalities of the controller. Such functionality is described further below with respect to FIG. 8.

As noted above, the satellites 704 monitor network traffic in their vicinity. In some embodiments where the satellites 704 include both a wired and wireless interface, the satellites 704 may also monitor network traffic occurring on the wired interface. Network traffic detected by the satellites 704 is monitored and used to generate a series of event messages describing the traffic. For example, in some embodiments every detected network data packet or network request is used to generate a corresponding event message. This network traffic may include, but is not necessarily limited to, Internet Protocol (IP) messages, Bonjour messages, Server Message Block (SMB) messages, and the like. It should be appreciated that any type of message protocol that could be detected through wired or wireless interfaces of the satellites 704 may serve as a basis for generation of an event message.

The event message 710 may include a variety of individual fields. For example, the event message 710 may include a signal strength field 718, a MAC address field 720, an event type field 722, a timestamp field 724, and an event payload field 726. The signal strength field 718 may include the measured signal strength of the radio frequency transmission that carried the message. By including the signal strength field in the event message 710, the controller 702 may be able to determine the distance between the satellite 704 reporting the event message and the network device 706 that originated in the message. In the case of wired communications, the signal strength field 718 may be left blank or otherwise include a token or value (e.g., 0) to indicate that the message was not received wirelessly.

The MAC address field 720 may include the MAC address of the originating device. By including the MAC address of the originating device, the event message 710 may indicate the network device that was the source of the network communication event to the controller 702.

The event type field 722 may include information describing the particular protocol or subset of the particular protocol associated with the network communication event. For example, the event type field 722 may indicate that the network communication event is an IP message, or, more specifically, an IP address resolution protocol (ARP) message or a Dynamic Host Configuration Protocol (DHCP) message, or the like.

The timestamp field 724 may include a sequence number or other timestamp at which time the satellite 704 received the message. The timestamp applied by the satellite 704 may be synchronized with the controller and/or other satellites to ensure that the internal clocks of each component device of the network analysis system (i.e., at least the satellites and controller) are synchronized with one another. In this manner, the timestamp may be used to identify duplicate messages, and to determine a detection order among multiple satellites.

The event payload field 726 may include additional data regarding the event, such as a copy of the data packet associated with the network communication event. In some embodiments, the event payload field 726 may not include the entire data packet, but instead just include the packet header or another reduced subset of all data included in the packet in order to conserve network bandwidth.

The event message 710 is provided to the controller 702, where the controller 702 processes the event message 710 to generate the network status data 712 for output.

Exemplary Data Flow for Event Message Processing

FIG. 8 depicts an example of a data flow for processing event messages using an example of a controller 800 to generate network status data in accordance with embodiments of the present invention. The controller 800 may be, or may be configured similarly to, the apparatus 200 described above with respect to FIG. 2. The controller 800 includes a message aggregator component 802, a network analyzer component 804, a message metadata storage component 805, a rules engine component 806, a premises mapper component 808, and a management interface 810.

The message aggregator component 802 includes a service that functions to receive event messages from one or more satellite devices as described above. The message aggregator component 802 may function as a centralized source for asynchronously receiving event messages, deduplication of received events, summarizing of received event messages, and transferring summarized messages to the network analyzer component 804 for processing. In support of this functionality, the message aggregator component 802 includes a high speed processing queue to support message intake and transfer in real-time. The message aggregator component 802 may also implement a message reception window for received event messages to assist with message deduplication, and synchronization across satellite devices. Examples of processes for managing such a message reception window are described further below with respect to FIGS. 11-12. The message aggregator component 802 may also calibrate timing mechanisms across satellite devices with a time clock maintained by the controller 800 to ensure consistent time stamp information across all components of the network analysis system.

Once the message aggregator component 802 has received and deduplicated event messages, these aggregated event messages may be provided to the network analyzer component 804 for processing. The network analyzer component 802 may examine the aggregated event messages to determine the protocol and any particular message type of the event message. During processing, the aggregated event messages may be translated from a native protocol into a meta language that generically describes the message, the purpose of the message (e.g., by mapping the message type to a known message protocol), the sending device, the signal strength of the message, the intended recipient device, any message payload, and the like. The message as translated into the meta language may be stored within the set (e.g., a database or data table) of message metadata 805. The set of message metadata 805 may be used for a variety of network analyses and/or metrics. For example, the message metadata 805 may be used as input to the rules engine component 806 to generate notifications or take other actions based on particular status information about the network as derived from the message metadata 805.

The rules engine component 806 may include a series of processes, threads, applications, or the like that monitor event messages and/or a set of message metadata to determine whether particular rule criteria have been met by those event messages and/or set of message metadata. When criteria for a rule are met, particular action may be taken. For example, rules may generate notifications by email, as a mobile push notification, through an audio output device in a home, or by various other notification techniques when a new, unknown device is detected. For example, when a previously unknown wireless device interrogates a network router to identify itself, a satellite device may generate an event message regarding the network interaction, inform the controller 800, and as a result of the message processing a message event may be stored in the set of message metadata 805 indicating the interrogation. The rules engine component 806 may maintain a list of known or previously authorized devices, and fire a rule to generate the notification when a new interrogation occurs from a device that is not on the list of previously authorized devices.

Rules may generally be considered to include a set of criteria and one or more actions to be taken in response to the criteria being met. The rules engine component 806 may allow for various criteria to be employed both separately and in conjunction with one another. Examples of rule criteria include, but are not limited to, detection of a previously known device by a satellite, detection of Internet communications by particular devices, detection of signal bit rates exceeding or dropping below particular thresholds, detection of a known device along with an unknown device, detection of a device at a particular location (e.g., in a particular room), detection of an out of date communication protocol or other indication that a software update is required for a particular device, detection that a previously known device has been absent from the network for a threshold amount of time, detection of expiration of a device warranty (e.g., where a device serial number is detected and cross-referenced with an external warranty management system), or the like.

Example actions that may be taken in response to having rule criteria met include, but are not limited to, generating a notification to various external systems and/or devices (e.g., loudspeaker, television, smartphone, router management interface, etc.), initiating a traffic monitoring operation between two or more devices, blocking a particular device (e.g., by notifying a router to block the device, such as through an application programming interface), triggering a camera to be directed to a particular location (e.g., in response to detecting an unknown device near an entry or exit based on location data), triggering an offer to a user to purchase an obsolete or unused device (e.g., where a device is previously known but has not been detected for a particular period of time), triggering a notification that a certain device is incompatible or sub-optimal based on the current network configuration, or the like. These actions may take the form of notifications generated by the rules engine component 806 which are transmitted out to various network devices as described above.

The rules engine component 806 may also include a rule authoring component that allows for specification of particular rule criteria and actions to be taken in response to those rule criteria. These rules may be defined through the management interface 810.

The premises mapper component 808 is configured to generate a visualization of a local physical area monitored by the controller 800 and attendant satellite devices and to illustrate the manner in which network devices are disposed and interact with that local physical area. The premises mapper component 808 receives a set of premises data which, combined with device location data generated by the network analyzer component 804 (e.g., through the use of RSSI readings), to generate the visualization.

In some embodiments, the premises mapper component 808 may execute a premises mapping operation in conjunction with one or more user devices. For example, the premises mapper may instruct a user to traverse their home while executing a mapping application on a smartphone that serves to capture signal strength data for various static devices (e.g., devices that are unlikely to move, such as routers or network-enabled fixtures) as the user walks through their home. In some embodiments, the user may provide a floor plan or other physical data to serve as a guide for the mapping operation. In some embodiments, the premises mapper component 808 may recommend particular locations for placement of satellite devices based on the results of the mapping operation.

The premises mapper component 808 may include an interface to allow a user to lay out a physical area (e.g., a perimeter and interior walls). The interface may also allow a user to select their location within that physical area and take a signal strength measurement to one or more access points (e.g., routers, network range extenders, or the like) or satellite devices. In some embodiments, if a signal strength received from one or more satellites fails to exceed a minimum threshold, then a notification of a recommendation to place a satellite device at the position with the low signal strength may be provided via the interface. In some embodiments, the interface may recommend placement of satellite devices at particular intervals (e.g., every 10 feet, 25 feet, or 50 feet).

In some embodiments, a list of discovered devices may be provided as derived by the network analyzer component 804 for placement by a user within an interface. The placement may be designed to correspond to the physical location of each detected device, which may be used within the visualization to illustrate the known positions of devices and to calibrate signal strength readings. In some embodiments, during a mapping operation, a signal may be sent to satellite devices and/or other components of a network analysis system to cause those devices to broadcast a particular signal (e.g., a "homing" signal).

By detecting signal strengths at various locations and providing the detected signals to the premises mapping component 808, a set of reference ranges may be detected for use in future RSSI device location operations.

Once the mapping operation is complete, the visualization may also be updated to indicate the presence of "weak" signal coverage zones. This information may also be utilized in subsequent troubleshooting operations to troubleshoot device performance by the network analysis component.

The management interface 810 may provide an interface, such as a Graphical User Interface (GUI), that allows a user to view the status of the network as derived by the network analyzer component 804, a premises map as derived by the premises mapper component 808, and notifications generated by the rules engine component 806. As noted above, the management interface 810 may also provide configuration data for controlling the operation of the controller 800, including but not limited to rule definitions, identification of network devices, and the like. The management interface 810 may, for example, provide an "information center" that shows the rate at which each device of the network is communicating on the network, which devices are communicating with particular cloud services, which devices are communicating with other external computing nodes, and the like. In conjunction with the rules engine, this network analysis data may be used to, for example, identify that a particular device is consuming large amounts of bandwidth in the middle of the night (e.g., a child using a streaming video service on their smartphone after bedtime) or other unauthorized or unexpected uses as defined within an established set of rules criteria.

Embodiments may also be employed to implement geofencing systems, such as to detect and log when particular devices (e.g., a child's smartphone) enter and exit detection range of the satellites.

Example of an Network Analysis Dashboard Interface

FIG. 9 depicts an illustration of an example of a dashboard interface 900 for displaying network analysis data and other output generated by a controller in accordance with embodiments of the present invention. The interface 900 includes icon representations for various devices detected on a home network. Selection of particular devices (e.g., through touching or clicking on an icon) may display network metrics and statistics associated with that device. The interface 900 may also include a series of interface controls to facilitate device discovery, editing of device data (e.g., to provide names or types for each detected device), and to access a user account. In some embodiments, a user account may include local credentials for accessing the controller, while in other embodiments the user account may provide a user with access to a remote server that receives data from the controller. This remote server may also provide an interface to access various other data associated with devices, such as by interfacing with manufacturer systems to manage device warranties (e.g., by identifying a warranty length), by offering the user the ability to purchase accessories, products, service plans, or the like for identified devices through third party services, for offering troubleshooting services, or the like.

The interface 900 may be displayed, for example, on an "app" executing on a user device such as a smartphone or tablet, through a server application executing on the controller, or through a web interface hosted on a remote server external to the user's network. In some cases, accessing the interface 900 may require accessing the user's network directly (e.g., as an attached device), while in other cases the interface 900 may be provided by an Internet routable system (e.g., through a web server executing on the controller or through an externally hosted site offered by a manufacturer of the controller).

Examples of Processes for Implementing a Network Analysis System

FIGS. 10-17 illustrate exemplary processes that may be employed by a controller device and/or satellite device to implement functionality of a network analysis system in accordance with embodiments of the present invention. These processes, and others, may be performed by, for example, the apparatus 200 described above with respect to FIG. 2 and/or the apparatus 300 described above with respect to FIG. 3, and in conjunction with the data flows and device interactions illustrated in FIGS. 4-8.

FIG. 10 illustrates a flow diagram depicting an example of a process 1000 for detecting a network communication event and transmitting an event message to a controller in accordance with embodiments of the present invention. The process 1000 serves as an example of a technique for detecting an event using a satellite device and causing transmission of that event to a controller for use in a network analysis operation in accordance with embodiments of the present invention.

At action 1002, one or more frequency bands are monitored for network traffic. Although the instant example is given with respect to monitoring of a wireless frequency band, it should be appreciated that embodiments may also include monitoring wired connections. At action 1004, a network communication event is detected on the monitored frequency band. As described above, the network communication event may be any network communication that occurs in a manner that is detectable by a satellite device. In some embodiments, different satellite devices have different monitoring capabilities. For example, a given satellite device may be configured with radios to detect one or more of Bluetooth, ZigBee, 802.11 a/b/g/n/ac, or the like, while another satellite device may lack one or more of those capabilities. In this manner, a user may select which satellite devices are most appropriate for their own home network configuration, especially in scenarios where unnecessary extra functionality results in more expensive hardware.

At action 1006, an event sequence number for the detected event is generated. The event sequence number may be generated as a result of or in conjunction with a timestamp value for the event. As described above, embodiments may synchronize clocks across the controller and satellite devices, such that each device clock is expected to be within a particular threshold time (e.g., <1 ms) of one another. The sequence number may thus be the timestamp of the message, or some combination of a characteristic of the message (e.g., a message type, message payload, or the like) combined with the timestamp.

At action 1008, an event message is generated for the received network communication event. As described above with respect to FIG. 7, the event message may include various characteristics of the message along with the sequence number. At action 1010, the generated event message is transmitted to a controller device for further processing.

FIG. 11 illustrates a flow diagram depicting an example of a process 1100 for initializing satellite devices using a controller device to enable the satellite devices and controller device to perform network analysis operations in accordance with embodiments of the present invention. The process 1100 may be performed, for example, when first initializing a controller and satellite devices together to establish a pairing between each satellite and the controller. Alternatively, the process 1100 may also be performed when adding a new satellite to a previously configured system. Initiating the process may include, for example, pressing a physical button on each device to initiate a pairing operation, so as to ensure that only devices belonging to the particular user are paired to the controller to preserve user privacy. The process 1100 may therefore be performed by the controller to establish an event window to take into account signal attenuation, reflecting, and propagation delay across different satellite devices when performing message deduplication for messages received from multiple satellite devices and to account for slight differences in internal clocks of each device. In some embodiments, the process 1100 may be performed at particular intervals to ensure that synchronization is maintained across the controller and satellite devices.

At action 1102, one or more local satellite devices are determined. As mentioned above, local satellites may be determined by physically pressing a button, flipping a switch, or otherwise interacting with a satellite to place it in pairing of initialization mode. Alternatively, a satellite device may automatically begin searching for a controller when first powered on, or the satellite device may enter a pairing mode based on a programmatic instruction transmitted wirelessly to the device or through a direct wire connection.

At action 1104, the clocks between the detected satellites are synchronized with one another and/or the controller. Synchronization may be performed according to various time synchronization protocols, including but not limited to Network Time Protocol, Precision Time Protocol, Clock Sampling Mutual Network Synchronization, or any other protocol sufficient for synchronizing clocks across multiple devices.

At action 1106, a satellite calibration operation is initiated. The satellite calibration operation may cause the satellite devices to transmit calibration signals comprising event messages to the controller at known, expected intervals. For example, after synchronizing the clocks, the controller may notify the satellites to each begin transmitting event messages at a particular start time and subsequently at a particular interval.

At action 1108, the calibration signals are received by the controller, and the times at which the calibration signals are received are stored. At action 1110, the different in time between the expected arrival of the calibration signals and the actual time of arrival of the calibration signals are used to determine an expected latency of message transmission time from the satellite devices to the controller. This latency may be utilized to calculate an event window time based on the satellite device with the greatest latency. For example, if a latency of 5 ms was measured for 3 satellite devices, and a latency of 10 ms for a fourth device (likely due to the fourth device being further away from the controller), then the event window for a given message sequence number would be set at 10 ms to allow adequate time for an event message measured by the fourth device to be sent back to the controller. Some embodiments may use alternative techniques or estimates to calculate a latency, such as doubling the latency to account for an instruction to transmit the calibration signal to be sent to the satellite prior to receiving the response to the calibration signal.

FIG. 12 illustrates a flow chart depicting an example of a process 1200 for using an event window to process event messages received from satellite devices in accordance with embodiments of the present invention. The process 1200 illustrates a technique employed by a message aggregator component, such as the message aggregator component 802 described above with respect to FIG. 8, to receive and aggregate messages prior to forwarding those messages to a network analyzer component for further processing.

At action 1202, a first event message is received. In response to receiving the first event message, a determination is made as to whether the event message is "new", such as whether the event message has a new sequence number. If the event message is new, an event window is opened at action 1204. As described above with respect to FIG. 11, the length of the event window may be determined based on the signal propagation delay from the highest latency satellite device employed within the network analysis system.

At action 1206, subsequent event messages with the same content (e.g., the same sequence number), and at action 1208 the event window is closed after the allotted time has elapsed. In cases where multiple event messages are received, it may be possible to determine a signal strength relate to each satellite device that detected the message. In such cases, RSSI location identification techniques may be employed to determine an approximate location for the device that initiated the message.

At action 1210, the event messages with the same content are summarized into a single event message with a single set of common data (e.g., the message type and other data common across all instances of the message), and unique sets of content that is unique per satellite device, such as a signal strength measured by each satellite device. At action 1212, the summarized event messages are provided as a single event for processing, such as by a network analyzer component 804 as described above with respect to FIG. 8.

At action 1214, an additional event message with the same event content (e.g., the same sequence number) is received. However, since the event window has closed, the additional event message is discarded at action 1216, since the event message with that sequence number has already been forwarded for processing. In this manner, embodiments avoid duplicate processing of the same event message, while still allowing multiple satellite devices to report the same event message. In some embodiments, repeated reception of event messages after the event window has closed may trigger a recalculation of the event window to decrease the likelihood of event messages coming in after the window has closed, while in other cases if messages are only received near the end of the event window very infrequently, then the event window may be shortened to increase the speed with which messages are summarized and provided for further processing.

FIG. 13 illustrates a flow diagram depicting a process 1300 for generating a visualization of a set of network devices in accordance with some embodiments. The process 1300 provides for generation of a visualization of a plurality of devices on an interface corresponding to a physical layout of a home or other building. The location of devices within the building may be determined based on measured signal strengths in relation to satellite devices, based on a network topology determined through communication with one or more networked devices, or through various other techniques for network analysis in accordance with embodiments as described herein.

At action 1302, premises data is received. As described above with respect to FIG. 6, the premises data may include a floor plan of a building, a drawing made on an interface provided for that purpose, or any other data that lays out the physical area corresponding to one or more network devices and/or satellite devices and a controller. At action 1304, locations for one or more devices are determined based at least in part on event messages received by satellite devices. For example, event messages may indicate the relative signal strength measured by each satellite device, and it may be possible to triangulate a location for the sending mobile device based on those measured signals. At action 1306, a premises map is generated using the device locations and the premises data. At action 1308, the premises map is provided through a management interface, such as via a user's smartphone, on a computer display, or the like.

FIG. 14 illustrates a flow diagram depicting an example of a process 1400 for processing event messages received from a message aggregator component in accordance with some embodiments of the present invention. As noted above, a message aggregator component may function to receive event messages from satellite devices and combine duplicate event messages for further processing. However, in order to ensure fast performance of the queue of event messages monitored by the message aggregator component, the message aggregator component may offload processing of those aggregated messages to a network analysis component of a controller. The process 1400 illustrates one example of a method for performing that processing by the network analysis component.

At action 1402, an aggregated event message is received. It should be appreciated that the term "aggregated" in this context merely refers to an event message that was processed by a message aggregator component, and that the aggregated event message may include only a single event message. At action 1404, the event protocol of the aggregated event message is determined. At action 1406, the aggregated event message is processed in accordance with the event protocol. For example, processing of the aggregated event message may include determining the context and purpose of the message based on the message type and the attendant protocol (e.g., whether the message is part of joining a network, transmitting data on the network, receiving data on the network, or the like). Processing of the message may include transforming the message into a meta language that is protocol agnostic. The meta language representation of the message may be stored in a set of message metadata at action 1408, for use in generating network status data, determining whether rule criteria are satisfied, and in support of various other functions of the network analysis system.

FIG. 15. Illustrates a flow diagram depicting an example of a process 1500 for implementing a rules engine component in accordance with some embodiments of the present invention. As described above with respect to FIG. 8, a rules engine may be employed to determine whether particular rule criteria are satisfied by network status data and/or message metadata generated by a network analyzer component. In the event the criteria for a rule are satisfied, the rules engine may take certain actions corresponding to the rule for which the criteria are satisfied.

At action 1502, rule configuration data is received. The rule configuration data may include a set of rule criteria and a set of actions to be performed in response to the rule criteria being satisfied. Some embodiments may include authoring tools and an authoring language for specifying the rule criteria and appropriate actions, while other embodiments may provide a list of eligible rules that a user may select from.

At action 1504, a set of message metadata is received, such as from a network analyzer component as described above. The message metadata may include processed event messages that indicate when devices have joined a network, left a network, come into proximity with one or more satellite devices, transmitted data to another device on the network, and/or the like.

At action 1506, the rule status criteria are determined based on the message metadata to determine if the criteria are satisfied. If the criteria are satisfied, the action associated with the rule is initiated. For example, many rules may include generation of a notification to a management interface, user device, audio output device, video output device, or the like. At action 1508, the notification is generated, and at action 1510, the notification is transmitted to the device that is the target of the notification.

FIG. 16 illustrates a flow diagram depicting a process 1600 for performing power management of a satellite device in a manner that preserves network security in accordance with embodiments of the present invention. As described above, the network analysis system enabled by a controller and satellite devices provides many novel applications, many of which relate to detection of security breaches and unauthorized devices. Accordingly, it is conceivable that some malicious users might desire to disable one or more components of the network analysis system to subvert these security applications. One way that a malicious user with physical access to a satellite device might attempt to do so would be to simply unplug the satellite device from its AC power source. However, the process 1600 illustrates a mechanism for preserving home security that may serve to thwart such a malicious user.

At action 1602, the process 1600 detects a loss of the primary power supply of the satellite device. In response, at action 1604, the satellite device switches over to battery backup power. However, since it is possible that the device was intentionally powered down to allow a malicious user to add an unauthorized device to the network, the switch to battery power at action 1604 may be accompanied by disabling an external indicator of power at action 1606. For example, if the satellite device includes an LED indicator to indicate it is powered on, the LED indicator may be disabled in response to switching to battery power. At action 1608, a notification may be transmitted to the controller for forwarding to a management interface to notify a user or other administrator of the loss of device power. In this manner, the satellite device may continue to provide network security operations while letting a potential malicious user believe that they have subverted the network security, increasing the likelihood the intrusion will be noticed.

FIG. 17 illustrates a flow diagram depicting an example of a process 1700 for utilizing a rules engine to provided improved home security in accordance with some embodiments of the present invention. The process 1700 illustrates how a location data derived from signal strength readings performed by satellite devices can generate a notification that configures a camera to view a location corresponding to an unknown device.

At action 1702, the process 1700 detects an unknown device based on an event message received from a satellite device. At action 1704, the location of the unknown device is determined, such as based on RSSI location determination techniques as described above. In response to determining the location of the unknown device, at action 1706 a notification may be generated to a pan-tilt-zoom camera to direct the camera to the identified location. In this manner, the camera system may be automatically programmed to be directed to an unknown entity, thus improving the user's home security system. For example, such a system could be used to identify a person with an unknown device approaching the user's home from an odd direction (e.g., not the front door), or to focus a camera on a visitor at the front door without having to manually open the door.

Embodiments of the present invention have been described above with reference to block diagrams and flowchart illustrations of methods, apparatuses, systems and computer program products. It will be understood that each block of the circuit diagrams and process flowcharts, and combinations of blocks in the circuit diagrams and process flowcharts, respectively, can be implemented by various means including computer program instructions. These computer program instructions may be loaded onto a general purpose computer, special purpose computer, or other programmable data processing apparatus to produce a machine, such that the computer program product includes the instructions which execute on the computer or other programmable data processing apparatus create a means for implementing the functions specified in the flowchart block or blocks.

These computer program instructions may also be stored in a computer-readable storage device that can direct a computer or other programmable data processing apparatus to function in a particular manner, such that the instructions stored in the computer-readable storage device produce an article of manufacture including computer-readable instructions for implementing the function discussed herein. The computer program instructions may also be loaded onto a computer or other programmable data processing apparatus to cause a series of operational steps to be performed on the computer or other programmable apparatus, thereby producing a computer-implemented process such that the instructions executed on the computer or other programmable apparatus cause performance of the steps and thereby implement the functions discussed herein.

Accordingly, blocks of the block diagrams support combinations of means for performing the specified functions, combinations of steps for performing the specified functions and program instruction means for performing the specified functions. It will also be understood that each block of the circuit diagrams and process flowcharts, and combinations of blocks in the circuit diagrams and process flowcharts, can be implemented by special purpose hardware-based computer systems that perform the specified functions or steps, or combinations of special purpose hardware and computer instructions.

Some additional embodiments may allow consumers to manage their devices and networks through an app or Web portal. Embodiments may also include a call center component, providing CSRs valuable insight to help target help and advice for troubleshooting, diagnosing, and recommending. Embodiments may help manage multiple devices, agnostic to manufacturer, type of device, operating system and network. Embodiments may enable troubleshooting through easy on device guides and a dashboard that illustrates where network connections and devices are failing. Where personal help is needed, 24/7 Live Support may be just a call, text, chat or email away.

Embodiments may also Block intruders who hitchhike on network and monitor the network for malware. Further embodiments may registers and keep track of warranties, extended service contracts, credit card double manufacturer warranties, and retail offerings. Embodiments may also provide reminders for services due (such as complimentary cleanings), notifications for software upgrades, relevant new peripherals, and product recalls. Some embodiments may alert users to expiring entitlements and product recalls. Embodiments may also provide easy access to user manuals.

Some embodiments may provide protection across devices for accidental and mechanical breakdowns, loss and theft, damage for power shortages, etc. and ID theft protection and assist with filing of claims. Some embodiments provide repair and loaners services and help put the user in touch with an appropriate repair facility and/or handle the repair on the consumer's behalf.

Some embodiments may provide personal advice for purchases related to your network devices, networks, and routers to help insure interoperability and compatibility based on actual usage needs and history for the individual. Embodiments may provide relevant contextual help and solutions. Some embodiments may provide an easy way to migrate away from old devices and upgrade to new devices and networks through providing trade in value, determining a venue for selling devices, personalized recommendations for new devices and network, and the like. Some embodiments may also include a loyalty component, with additional or added benefits based on length of subscription, number of devices attached to the network, or the like.

Embodiments may provide relevant functionality through a variety of user interfaces. For example, embodiments may provide dashboards to provide a high level overview into the health, connections and performance of devices individually and as a connected network. A "Getting Started" interface may assist users with registration and set up the devices to be monitored and proper network configurations.

During device registration, embodiments may collect key information in order to complete OEM registration and begin tracking of entitlements (e.g., warranties or replacement plans). Such entitlements may include retailer offers provided at POS (e.g., annual cleanings), OEM offers and upgrades, home owners insurance riders/core coverage, or credit card benefits (e.g., double manufacturer warranties, 90 day protection, and other features). Embodiments may also populate a section with user manuals or links to user manuals for registered devices.

Some embodiments may provide step by step set up instructions, identify compatibility issues, and provide tips and tricks for setting up devices. Such tips and tricks may include personalized, timely, appropriate recommendations for additional products and services to support devices and networks.

Embodiments may also provide regular maintenance services such as assisting with helping diagnose small problems before they become big ones, assisting users with troubleshooting problems through on device, crowd-sourced and live tech support, helping predict future issues such as storage limitations, battery, connectivity issues, monitoring the security of the network, preventing malware and hitchhikers, and providing protection for and one click claims service. Such claims may include claims for services covering loss, accidental damage, mechanical breakdown, theft/burglary, malware, identity theft, or the like. Some embodiments may provide information personalized to the user, devices, and/or networks.

Some embodiments may provide alerts and/or notifications related to entitlements (e.g., expiring, new offers, reminders), device and network(s) issues, device and network specific notices (e.g., upgrades, new solutions to solve common dilemmas), safety/security concerns (e.g., malware detected; hitchhikers detected), and/or relevant help related to "devices" connected (e.g. car alerts you that the brake pads are running thin, sends alert and helps solve the problem with a close by and good price repair solution).

Embodiments may also assist with making changes to the network and devices/migration (e.g., adding to and retiring devices and/or network(s)). Embodiments may assist with adding new devices, new networks and migrating away from old devices, old networks, and old peripherals.

Some embodiments may provide advice based on users habits as monitored by the digital concierge, the user's particular needs, and knowledge of the user's existing network and compatibility/interoperability considerations to provide counsel and guidance on new purchases.

Some embodiments may provide an independent estimate for the value of a device for a trade in based upon the condition of the device, including a certification of the device's status based on the results of a device diagnostic.

Some embodiments may assist with the purchase of new devices. Such embodiments may provide venues and price guarantees for new product purchases and access to used/rebuilt/customized (with all settings and features)/certified devices.

Some embodiments may provide the ability to cover device by extending existing protection coverage where coverage already exists for device(s) and/or network(s) or to begin coverage process with new purchases. Some embodiments may assist with data back up and data transfer operations to facilitate migration to new devices. Such migration may include providing back up and transfer of data. Embodiments may perform such migration by restoring settings, even across platforms or operating systems.

Embodiments may also provide a customer service dashboard and tools. For example, a dashboard may provide insights into the customer's devices and connections, apps and behavior of the consumer with the device. Embodiments may also include a recommendation tool to assist a customer service representative with obtaining information on devices and networks and peripherals to best solve the customer's problems.

Embodiments may also include tracking historical information to assist customer service representatives with predicting problems. Some embodiments provide a complete view of the consumer's prior activity, including previous tickets, all devices, all connections, and/or all networks. Embodiments may possess the ability to handle cross sells of, for example, insurance products.

Some embodiments may leverage the use of aggregated data to provide device diagnostic, detection, and management functions. For example, devices may measure device and network performance over time and based on the manner in which the device is used by the user. Embodiments may determine how other devices and networks perform in comparison. Some embodiments may identify a trade in condition of one or more devices, and determine how the device rates/ranks for its age and type and true fair market value based on actual condition of the device.

Embodiments may provide personalized offers based on the device types of connected devices, the user's network, and the user's behaviors with their devices and networks. Embodiments may also monitor and facilitate device migration behavior. For example, embodiments may track and facilitate switching behavior, including tracking the makes and models of devices and networks; track a number of months to upgrade; and/or track the effect of protection on switching behavior, upgrades, and trade-ins. Embodiments may also provide recommendations based on user behavior, devices, networks, and/or a determined level of "tech savvyness" assigned to the user. Some embodiments may also how tips and tricks are provided to the user, such as based on contextual need, a tech savvyness score, the presence of a particular device, or the overall status of the network. Some embodiments may include predictive alerts to anticipated device problems based on known device issues, model, age of device, or device behavior pre event. Embodiments may also measure performance to identify what devices and networks perform best for whom and under what circumstances.

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A controller for network analysis comprising:
   network analysis circuitry configured to detect devices on a network, monitor network conditions, and provide data to a device management circuitry;

device management circuitry configured to determine characteristics of the network based on data received from the network analysis circuitry, triangulate performance from multiple devices to determine optimal network speeds to support each device, and prepare suggested optimizations or troubleshooting measures; and a remote management circuitry configured to provide a remote interface for visualizing data generated by the device management circuitry and the network analysis circuitry including the suggested optimizations or troubleshooting measures.

2. The controller according to claim 1 further comprising a rules engine configured to monitor event messages and/or a set of message metadata to determine whether particular rule criteria have been met by the event messages and/or set of message metadata.

3. The controller according to claim 2, further comprising a rule authoring component configured to allow users to specify particular rule criteria and actions to be taken in response to the particular rule criteria.

4. The controller according to claim 2, wherein the controller is configured to take one or more actions in response to having the particular rule criteria met, wherein the one or more actions comprises:

generating a notification to various external systems and/or devices;

initiating a traffic monitoring operation between two or more devices;

blocking a particular device;

triggering a camera to be directed to a particular location;

triggering an offer to a user to purchase an obsolete or unused device; and/or triggering a notification that a certain device is incompatible or sub-optimal based on current network configuration.

5. The controller according to claim 1, further comprising a premises mapper component configured to execute a mapping operation in conjunction with one or more user devices.

6. The controller according to claim 1, further configured to detect and monitor at least one of network bandwidth, network connection and disconnection events, IP conflicts, and presence of certain types and quantities of data packets.

7. The controller according to claim 1, wherein the network analysis circuitry is configured to detect network data in a promiscuous manner by receiving and analyzing packets not intended for the controller.

8. The controller according to claim 1, wherein the network analysis circuitry is configured to generate electronic information notifying the device management circuitry of newly detected devices.

9. The controller according to claim 8, further configured to provide, via the remote interface, an indication of whether the newly detected devices are authorized.

10. The controller according to claim 8, further configured to detect when an unauthorized device has entered the network.

11. The controller according to claim 1, further configured to store device information in a data structure to indicate a device type, various network metrics associated with a device, and whether the device is known and/or authorized.

12. A method for providing troubleshooting information comprising:

receiving at least one event message, wherein the at least one event message is generated based on at least one network communication event associated with a network;

analyzing the at least one event message using a controller to determine network status information associated with the at least one event message;

generating network status information based on the at least one event message;

providing the network status information to a dashboard, wherein the dashboard outputs a status of one or more devices connected to the network and troubleshooting information for the one or more devices; and triangulating performance from multiple devices to determine optimal network speeds to support each device.

13. The method of claim 12, wherein the network status information comprises a network topology, and wherein the troubleshooting information comprises suggested changes to the network topology.

14. The method of claim 12 further comprising monitoring event messages, including the at least one event message, and/or a set of message metadata associated with the event messages to determine whether particular rule criteria have been met by the event messages and/or set of message metadata.

15. The method of claim 12 further comprising storing device information in a data structure to indicate a device type of the one or more devices, various network metrics associated with the one or more devices, and whether the one or more devices are known and/or authorized.

16. A method for troubleshooting device performance comprising:

receiving premises data associated with a premises and defining a physical area corresponding to one or more network devices and a controller;

executing a premises mapping operation on a user device, wherein the premises mapping operation executes a mapping application to capture signal strength data for various static devices on a network as the user device traverses the physical area;

generating device location data associated with the various static devices on the premises;

generating a visualization of the various static devices on the network and displaying the visualization to a user;

updating the visualization to generate an updated visualization that indicates a presence of weak signal coverage zones;

utilizing the updated visualization to troubleshoot device performance using a network analysis component; and triangulating performance from multiple devices to determine optimal network speeds to support each device.

17. The method of claim 16, further comprising monitoring event messages and/or a set of message metadata associated with the various static devices and/or user device to determine whether particular rule criteria have been met by the event messages and/or set of message metadata.

18. The method of claim 16, further comprising creating and/or editing, via a rule authoring component, particular rule criteria and actions to be taken in response to the particular rule criteria.

19. The method of claim 16, further comprising storing device information in a data structure to indicate a device type of the various static devices and/or user device, various network metrics associated with the various static devices and/or user device, and whether the various static devices and/or user device are known and/or authorized.

* * * * *